(12) United States Patent
Zhu

(10) Patent No.: US 12,123,507 B2
(45) Date of Patent: Oct. 22, 2024

(54) VALVE, MULTI-FUNCTIONAL COMBINATION VALVE AND CFLVV VALVE

(71) Applicants: YingZhi AIYI intelligent Automotive Technologies (Jiaxing) Co., Ltd., Pinghu (CN); SHANGHAI JTR AUTOMOTIVE COMPONENT CO., LTD., Shanghai (CN)

(72) Inventor: Xiaotong Zhu, Pinghu (CN)

(73) Assignees: YINGZHI AIYI INTELLIGENT AUTOMOTIVE TECHNOLOGIES (JIAXING) CO., LTD., Zhejiang (CN); SHANGHAI JTR AUTOMOTIVE COMPONENT CO., LTD., Shanghai (CN)

(*) Notice: Subject to any disclaimer, the term of this patent is extended or adjusted under 35 U.S.C. 154(b) by 0 days.

(21) Appl. No.: 18/039,160

(22) PCT Filed: Jan. 25, 2021

(86) PCT No.: PCT/CN2021/073573
§ 371 (c)(1),
(2) Date: May 26, 2023

(87) PCT Pub. No.: WO2022/110532
PCT Pub. Date: Jun. 2, 2022

(65) Prior Publication Data
US 2024/0003445 A1    Jan. 4, 2024

(30) Foreign Application Priority Data

Nov. 26, 2020   (CN) .......................... 202011352062.0
Nov. 26, 2020   (CN) .......................... 202022774351.1

(51) Int. Cl.
*F16K 11/22*    (2006.01)
*B60K 15/03*    (2006.01)
(Continued)

(52) U.S. Cl.
CPC ........ *F16K 11/22* (2013.01); *B60K 15/03006* (2013.01); *F16K 1/465* (2013.01);
(Continued)

(58) Field of Classification Search
CPC ........... Y10T 137/309; Y10T 137/7838; Y10T 137/7846; Y10T 137/7847;
(Continued)

(56) References Cited

U.S. PATENT DOCUMENTS 4,655,238 A * 4/1987 Szlaga ............. B60K 15/03519
                                                  137/43
5,027,844 A * 7/1991 Forsythe ................. F16K 17/36
                                                  220/203.19
(Continued)

FOREIGN PATENT DOCUMENTS

CN       102062220 A    5/2011
CN       206309954 U    7/2017
(Continued)

*Primary Examiner* — Umashankar Venkatesan
*Assistant Examiner* — Frederick D Soski
(74) *Attorney, Agent, or Firm* — MUNCY, GEISSLER, OLDS & LOWE, P.C.

(57) ABSTRACT

A valve, a multi-functional combination valve and a CFLVV valve simultaneously achieve the functions of a refueling limit valve and a rolling-over valve in a fuel tank. The valve body includes a valve core accommodating cavity, and first and second inflow passages, a first discharge port, and a second discharge port communicating therewith are provided. The valve core accommodating cavity includes two independent vertical-sliding first valve core assemblies and second valve core assemblies for opening or closing the first discharge port and the second discharge port. The pressure maintaining part is connected to the second discharge port and contains a certain opening pressure. After the first valve core assembly closes the first discharge port, and a certain pressure value has to be reached in the valve core accom- (Continued)

modating cavity, the pressure maintaining part will open the second discharge port, and the fluid will flow out of the second discharge port.

19 Claims, 14 Drawing Sheets

(51) Int. Cl.
F16K 1/46 (2006.01)
F16K 17/164 (2006.01)
(52) U.S. Cl.
CPC .. *F16K 17/164* (2013.01); *B60K 2015/03026* (2013.01); *Y10T 137/0874* (2015.04)
(58) Field of Classification Search
CPC ......... Y10T 137/7848; Y10T 137/7849; F16K 11/22; F16K 1/465; F16K 17/164; F16K 15/041; B60K 15/03006; B60K 2015/03026
See application file for complete search history.

(56) References Cited

U.S. PATENT DOCUMENTS

| | | | | |
|---|---|---|---|---|
| 5,065,782 | A * | 11/1991 | Szlaga | B60K 15/03519 137/39 |
| 5,116,257 | A * | 5/1992 | Szlaga | F02M 25/0836 137/589 |
| 5,156,178 | A * | 10/1992 | Harris | B60K 15/03519 220/746 |
| 5,325,882 | A * | 7/1994 | Forsythe | B60K 15/03519 220/202 |
| 5,413,137 | A * | 5/1995 | Gimby | F16K 24/044 137/200 |
| 5,439,023 | A * | 8/1995 | Horikawa | F16K 17/36 137/202 |
| 5,518,018 | A * | 5/1996 | Roetker | B60K 15/03519 137/493 |
| 5,522,417 | A * | 6/1996 | Tomioka | F16K 17/36 137/202 |
| 5,566,705 | A * | 10/1996 | Harris | F16K 24/042 137/493 |
| 5,694,968 | A * | 12/1997 | Devall | B60K 15/03519 137/202 |
| 5,762,090 | A * | 6/1998 | Halamish | F16K 24/044 137/202 |
| 5,762,093 | A * | 6/1998 | Whitley, II | B60K 15/03519 137/202 |
| 5,960,816 | A * | 10/1999 | Mills | F16K 24/044 137/202 |
| 6,035,884 | A * | 3/2000 | King | B60K 15/03519 137/202 |
| 6,142,167 | A * | 11/2000 | Pettesch | F16K 24/04 137/39 |
| 6,719,000 | B1 * | 4/2004 | Forsythe | F16K 24/044 137/202 |
| 7,614,417 | B2 * | 11/2009 | Simon | B60K 15/03519 137/202 |
| 8,109,285 | B2 * | 2/2012 | Ehrman | F16K 24/042 137/202 |
| 9,518,671 | B2 * | 12/2016 | Sui | F16K 27/02 |
| 2001/0025652 | A1 * | 10/2001 | Sugizaki | F16K 24/044 137/202 |
| 2001/0047822 | A1 * | 12/2001 | Aoki | B60K 15/03519 137/202 |
| 2002/0017281 | A1 * | 2/2002 | Crary | F02M 37/20 123/516 |
| 2002/0059954 | A1 * | 5/2002 | Aoki | B60K 15/04 137/202 |
| 2003/0062083 | A1 * | 4/2003 | Nishi | F16K 24/044 137/202 |
| 2003/0098063 | A1 * | 5/2003 | Mori | B60K 15/03519 137/202 |
| 2004/0003844 | A1 * | 1/2004 | Yamada | F16K 24/044 137/202 |
| 2004/0060596 | A1 * | 4/2004 | Frohwein | F16K 24/044 137/202 |
| 2004/0149333 | A1 * | 8/2004 | Johansen | F16K 24/044 137/202 |
| 2004/0187923 | A1 * | 9/2004 | Nishi | F16K 24/042 137/202 |
| 2004/0211465 | A1 * | 10/2004 | Miyoshi | F16K 24/044 137/202 |
| 2004/0238033 | A1 * | 12/2004 | Miyoshi | B60K 15/03519 137/202 |
| 2005/0022869 | A1 * | 2/2005 | Beyer | F16K 24/04 137/202 |
| 2005/0092364 | A1 * | 5/2005 | Furuya | F16K 17/196 137/202 |
| 2006/0065305 | A1 * | 3/2006 | Nojiri | F16K 24/044 137/202 |
| 2006/0254641 | A1 * | 11/2006 | Callahan | A01D 34/82 137/43 |
| 2007/0006919 | A1 * | 1/2007 | Tagami | F16K 24/044 137/202 |
| 2007/0039648 | A1 * | 2/2007 | Simon | B60K 15/03519 137/202 |
| 2007/0068574 | A1 * | 3/2007 | Kito | F16K 24/044 137/202 |
| 2007/0102043 | A1 * | 5/2007 | Ehrman | F16K 24/042 137/202 |
| 2007/0125428 | A1 * | 6/2007 | Furuya | F16K 24/044 137/202 |
| 2007/0186973 | A1 * | 8/2007 | Miyoshi | B60K 15/03519 137/41 |
| 2007/0284001 | A1 * | 12/2007 | Yamada | F16K 24/044 137/202 |
| 2009/0084449 | A1 * | 4/2009 | Matsuo | F16K 24/044 137/409 |
| 2009/0194170 | A1 * | 8/2009 | Martin | F16K 24/044 137/197 |
| 2010/0065134 | A1 * | 3/2010 | Miura | F16K 24/044 137/430 |
| 2010/0089466 | A1 * | 4/2010 | Kobayashi | F02M 37/0082 137/409 |
| 2010/0108155 | A1 * | 5/2010 | Kobayashi | F16K 24/044 137/202 |
| 2010/0319787 | A1 * | 12/2010 | Hirata | F02M 37/0023 137/165 |
| 2011/0005609 | A1 * | 1/2011 | Suzuki | B60K 15/03519 141/59 |
| 2011/0186149 | A1 * | 8/2011 | Tagami | B60K 15/035 137/409 |
| 2011/0315241 | A1 * | 12/2011 | Yasuda | F16K 24/044 137/409 |
| 2014/0290787 | A1 * | 10/2014 | McAvey | B65D 47/26 141/1 |
| 2015/0034174 | A1 * | 2/2015 | Sui | F16K 24/044 137/202 |
| 2017/0036531 | A1 * | 2/2017 | McLauchlan | B60K 15/03504 |
| 2017/0350521 | A1 * | 12/2017 | Ogiwara | B60K 15/03504 |
| 2019/0092162 | A1 * | 3/2019 | Iino | F16K 15/063 |
| 2020/0032748 | A1 * | 1/2020 | Solano | F16K 27/0281 |
| 2020/0086737 | A1 * | 3/2020 | Ito | B60K 15/03006 |
| 2020/0361309 | A1 * | 11/2020 | Wetzel | F16K 31/5282 |
| 2020/0406744 | A1 * | 12/2020 | Jung | F16K 31/0655 |

FOREIGN PATENT DOCUMENTS

| | | |
|---|---|---|
| CN | 209159416 U | 7/2019 |
| CN | 209494941 U | 10/2019 |
| CN | 111098704 A | 5/2020 |
| CN | 112228608 A | 1/2021 |
| WO | WO0150045 A3 | 12/2001 |

* cited by examiner

VALVE, MULTI-FUNCTIONAL COMBINATION VALVE AND CFLVV VALVE

TECHNICAL FIELD

The invention is in the technical field of valves, and more particularly relates to a valve, a multi-functional combination valve and a CFLVV valve.

BACKGROUND ART

There are two general requirements for fuel tanks on the market today. 1. Refueling limit (overfilling is prohibited). 2. The fuel tank can be normally vented under certain circumstances. When there is positive pressure in the fuel tank, the pressure can be released in time. Or, when there is negative pressure in the fuel tank, the gas can be replenished into the fuel tank in time. Generally, in order to meet the above requirements of fuel tanks, a fuel tank needs to be equipped with a refueling limit valve and at least one rolling-over valve. There have been new designs on the market that allow a fuel tank valve to meet both of the two functional requirements described above, integrating the functions of the two valves into one product, thus reducing the number of valves that the fuel tank needs to be provided with, and making it easier to lay out on the fuel tank. We generally call it as a combination valve, i.e., combining the refueling limit valve and the rolling-over valve together, so that one product has both functions.

With the promulgation of the National Sixth Stage Pollutant Emission Standards For Motor Vehicles, the requirements for evaporative emissions of the whole fuel system are becoming more and more stringent. The requirements for dynamic leakage of fuel tank (generally including horizontal sloshing test, angular rollover sloshing test and six-axis sloshing test, etc.) are also increasing, so that there is a certain test for the design of valves, whether they are refueling limit valves or rolling-over valves or combination valves, due to that these valves are installed and fixed on the fuel tank, the valve core communicates with the interior of the fuel tank, and the pipe orifices of the valves are generally connected to the carbon tank through pipelines. When the vehicle fluctuates during running, the fuel in the fuel tank will also surge. If the valve core inside the valve cannot seal the exhaust passage in time, the fuel will have a certain probability of surging out of the exhaust passage of the valve, flowing out through the pipe orifices, forming a leakage phenomenon.

There are currently two main types of combination valves on the market. In one of them, the combination valve as a whole is relatively large, with one side being the valve core of the refueling limit valve and one side being the valve core of the rolling-over valve, which do not interfere with each other. However, since the two valve cores are separated, the combination valve is much larger than a common refueling limit valve, so that the cost is relatively high and the layout on the fuel tank is relatively difficult. In another one, the size of the combination valve is similar to that of a common refueling limit valve. According to the combination valve, the valve core of the refueling limit valve and the valve core of the rolling-over valve are stacked together, with the small float stacked on the large float. The small float correspondingly achieves the function of the refueling limit valve, and the large float correspondingly achieves the function of the rolling-over valve. However, in this design, since two valve cores are stacked together, the functions of the corresponding two valve cores will also affect each other. If one valve core is to be adjusted, the performance of the other valve core may be affected, so that there is a great limitation in adjusting the performance of the whole valve core.

SUMMARY OF THE INVENTION

The technical problem to be solved by the invention is to provide a valve, a multi-functional combination valve and a CFLVV valve, so as to solve the problem of two valve cores affecting each other in the existing combination valve.

In order to solve the technical problems, the technical solution provided by the invention is as follows.

A valve of the invention comprises a valve body, a valve core, and a pressure maintaining part;
wherein a valve core accommodating cavity is provided in the valve body; the valve body is provided with a first inflow passage and a second inflow passage which communicate the valve core accommodating cavity with a space outside the valve body, and an inlet of the second inflow passage is higher than an inlet of the first inflow passage; an upper end of the valve body is provided with a first discharge port and a second discharge port in communication with the valve core accommodating cavity;
the valve core comprises a first valve core assembly, a second valve core assembly; wherein the first valve core assembly and the second valve core assembly are respectively vertically slidably connected to the valve core accommodating cavity for opening or closing the first discharge port and the second discharge port, respectively; the pressure maintaining part is provided on a top surface of the valve body, and an input end communicates with the second discharge port for defining a pressure required to discharge the fluid from the second discharge port;
after the first discharge port is closed in cooperation with the first valve core assembly, and after the fluid in the valve core accommodating cavity has to reach a certain pressure value, the pressure maintaining part will open the second discharge port, and the fluid will be discharged from the second discharge port, so as to achieve the function of the rolling-over valve; the two valve core assemblies achieve different functions without affecting each other; and at the same time, a combination valve with different technical requirements can be obtained by respectively adjusting the two valve core assemblies.

According to the valve of the invention, the valve core further comprises a sealing assembly provided at a top end of the valve core accommodating cavity or vertically slid in the valve core accommodating cavity for engaging the first valve core assembly to open or close the first discharge port; the sealing assembly is further provided with a communication passage for communicating the second discharge port and the second inflow passage, for cooperating with the second valve core assembly to switch the second discharge port.

According to the valve of the invention, the sealing assembly is provided on a top surface of the valve core accommodating cavity, the sealing assembly being a seal; the seal is provided at the first discharge port and the second discharge port; the seal forms a communication passage through which the first discharge port communicates with the valve core accommodating cavity for cooperating the first valve core assembly to open or close the first discharge port; the seal forms a communication passage through which the second discharge port communicates with the valve core accommodating cavity for engaging the second valve core assembly to open or close the second discharge port.

According to the valve of the invention, the sealing assembly is slidably connected to the valve core accommodating cavity, the sealing assembly comprising a slide and a seal;

the slider is slidably connected to the valve core accommodating cavity, and the seal is mounted on the slider; the seal is provided with a sealing block for sealing the first discharge port, and is further provided with a communication passage for communicating with the second discharge port;

the slider is driven to slide up and down by the first valve core assembly, and cooperates with the sealing block to open or close the first discharge port; and the communication passage communicating with the second discharge port is adapted to cooperate with the second valve core assembly to open or close the second discharge port.

The valve of the invention further comprises a connecting flange, wherein the connecting flange is connected to the valve body and cooperates with a top surface of the valve body to form a fluid discharge chamber for directing the fluid discharged from the first discharge port and the pressure maintaining part.

According to the valve of the invention, the valve body comprises an upwardly opened outer shell and a downwardly opened adapter shell; the outer shell is sleeved on a lower end of the adapter shell and is fixedly connected to the adapter shell; an inner wall surface of the adapter shell cooperates with a bottom surface of the outer shell to form the valve core accommodating cavity; at least one first connection port is opened on the shell body of the outer shell; the first connection port, an outer wall surface of the adapter shell and an inner wall surface of the outer shell cooperate to form a third inflow passage communicating with the valve core accommodating cavity;

at least one second connection port communicating with the valve core accommodating cavity is provided on the shell body of the adapter shell, and the first connection port and the second connection port cooperate to form the first inflow passage;

at least one third connection port is opened on the outer shell; at least one fourth connection port communicating with the valve core accommodating cavity is provided on the shell body of the adapter shell; and the third connection port, the fourth connection port and the communication passage of the sealing assembly cooperate to form the second inflow passage.

According to the valve of the invention, the inner wall surface of the adapter shell is provided with a plurality of vertically arranged first guide sliding rails, and the first valve core assembly is slidably connected to the first guide sliding rails; a hollow member is provided on the bottom surface of the inner cavity of the shell; the hollow member cooperates with the bottom surface of the inner cavity to form a vertical guide groove; a plurality of vertically arranged second guide sliding rails are provided on the inner wall surface of the hollow member; and the second valve core assembly is slidably connected to the second guide sliding rail.

According to the valve of the invention, the first valve core assembly comprises a first float and a first elastic member; the first float is slidably connected to the valve core accommodating cavity; and both ends of the first elastic member are respectively connected to the first float and the bottom surface of the valve core accommodating cavity.

According to the valve of the invention, the second valve core assembly comprises a second float, a second elastic member, and a movable member; the second float is slidably connected to the valve core accommodating cavity, and both ends of the second elastic member are respectively connected to the second float and the bottom surface of the valve core accommodating cavity; and the movable member is movably connected to a top surface of the second float for cooperating the sealing assembly to open or close the second discharge port.

The valve of the invention is characterized in that the pressure maintaining part comprises a pressure maintaining shell and a pressure maintaining cap; an accommodating space is provided in the pressure maintaining shell, and an inflow hole and a discharge hole in communication with the accommodating space are further provided on the pressure maintaining shell; the pressure maintaining shell is provided on a top surface of the valve body, and the inflow hole communicates with the second discharge port; and the pressure maintaining cap is slidably connected to the accommodating space for opening or closing the inflow hole.

The valve of the invention further comprises an elevation tube having one end mounted to the valve body and communicating with the second discharge port; the other end of the elevation tube is connected to the pressure maintaining shell and communicates with the inflow hole; the pressure maintaining shell cooperates with the valve body through the elevation tube to form a large exhaust passage that communicates with the first discharge port.

According to the valve of the invention, the pressure maintaining part further comprises an elastic member provided in the accommodating cavity, and both ends of the elastic member are respectively connected to an inner wall surface of the accommodating cavity and the pressure maintaining cap for providing a pressing force for the pressure maintaining cap to close the inflow hole.

According to the valve of the invention, the third inflow passage is provided with a stopper for limiting a flow area of the third inflow passage.

According to the valve of the invention, the stopper is an annular stopper provided on an outer wall surface of the adapter shell for limiting the flow area of the third inflow passage.

The valve of the invention further comprises an elevation part provided on a bottom surface of the valve core accommodating cavity and corresponding to any one of the valve core assemblies in the valve core accommodating cavity for raising a lowest height of the corresponding valve core assembly.

According to the valve of the invention, the elevation part is a recessed groove provided on an outer bottom surface of the valve body, and a recess direction of the recessed groove faces towards the valve core accommodating cavity to form a protrusion in the valve core accommodating cavity; and a corresponding valve core assembly is mounted on the top surface of the protrusion.

A multi-functional combination valve according to the invention comprises a valve according to any of the preceding items.

A CFLVV valve according to the invention comprises a valve according to any of the preceding items.

Compared with the prior art, the invention has the following advantages and positive effects because it adopts the above technical solutions.

1. According to an example of the invention, a valve core accommodating cavity is provided in the valve body, and a first inflow passage, a second inflow passage, a first discharge port, and a second discharge port communicating therewith are provided. The two inflow passages serve to guide an external fluid into the valve core accommodating cavity, and the two discharge ports serve to discharge the fluid in the valve core accommodating cavity. The valve core accommodating cavity is provided with two independent vertical-sliding first valve core assemblies and second valve core assemblies respectively used for opening or closing the first discharge port and the second discharge port so as to achieve the function of the refueling limit valve. The pressure maintaining part is connected to the second discharge port and contains a certain opening pressure for limiting the fluid discharged through the second discharge port. After the first discharge port is closed in cooperation with the first valve core assembly, and after the fluid in the valve core accommodating cavity has reached a certain pressure value, the pressure maintaining part will open the second discharge port, and the fluid will pass through the second discharge port, so as to achieve the function of the rolling-over valve. The two valve core assemblies can achieve different functions and do not affect each other. Meanwhile, a combination valve with different technical requirements can be obtained by adjusting the performances of the two valve cores respectively, so as to solve the problem of two valve cores affecting each other in the existing combination valve. At the same time the two valve core assemblies are designed in one valve core accommodating cavity, reducing the volume of the valve and facilitating the placement of the valve in the fuel tank.

2. In an example of the invention, a sealing assembly is further provided in the valve body for performing opening or closing operations of the two discharge ports in cooperation with the two valve core assemblies, respectively, to improve the sealing performance of the valve. The sealing assembly can be arranged in a sliding manner in the valve core accommodating cavity, or can be fixedly arranged at the two discharge ports. The arrangement manner is flexible, and different arrangements can be used for different technical requirements. Meanwhile, when the sealing effect of the valve is insufficient after a long period of use, only the sealing assembly needs to be replaced.

3. In an example of the invention, the guide groove is formed by providing a first guide sliding rail on the inner wall surface of the adapter shell and providing a hollow member on the bottom surface of the inner cavity of the outer shell. A second guide sliding rail is provided on the inner wall surface of the hollow member. The first guide sliding rail and the second guide sliding rail are respectively slidably connected to the first valve core assembly and the second valve core assembly for limiting the vertical movement of the two valve core assemblies. The amount of movement of the valve core assembly can be defined by designing the mating clearance of the sliding joint. At the same time, the contact area between the valve core assembly and the parts in contact during the movement can be reduced to decrease the friction between each other, so that the valve core assembly is more flexible and easy to open or close the corresponding discharge port during the movement.

4. In an example of the invention, a movable member is provided at the top of the second float. The movable member cooperates with the sealing assembly to close the second discharge port when the second float rises to the closed position. The combination of the movable member with the second float makes it easier for the sealed second discharge to be open.

5. In an example of the invention, the pressure maintaining part includes a pressure maintaining shell and a pressure maintaining cap sliding therein. After the first discharge port is closed, the pressure in the valve core accommodating cavity increases continuously, and the fluid can only be discharged from the second discharge port. The pressure maintaining part is provided at the outlet of the second discharge port, which defines a certain pressure on the second discharge port. When the pressure in the valve core accommodating cavity reaches a desired pressure, the pressure maintaining cap slides and opens in the pressure maintaining shell, and the fluid in the valve core accommodating cavity can be discharged through the pressure maintaining shell, thereby achieving the function of the rolling-over valve.

6. In an example of the invention, a stopper is provided in the third inflow passage to provide a relative separation between the external fluid and the internal valve core when a volume of fluid enters the valve core accommodating cavity through the third inflow passage, thereby providing isolation to the fluid and preventing the valve core assembly from prematurely closing due to a large flush of fluid. In addition, in severe conditions such as a large amplitude of sloshing, the fluid will enter the valve core accommodating cavity through the third inflow passage due to sloshing. In this case, the design of the stopper will also make the fluid relatively isolated from the valve core accommodating cavity, and less fluid will enter the valve core accommodating cavity, reducing the impact of sloshing conditions on the valve core assembly. At the same time, less fluid will enter the valve core accommodating cavity, and the probability of fluid leakage from the valve body in the dynamic process will be greatly reduced.

7. In an example of the invention, a recess concaved upwards is provided in the bottom of the outer surface of the outer shell. The lowest sliding position of the second float is elevated for a elevated design, so that the fluid entering the valve core accommodating cavity needs to reach a certain level before the second float is sufficiently buoyant and elevated to avoid premature lifting of the second float and closing of the second discharge port. At the same time, since the second float is in a higher position, relatively less fluid can enter the valve core accommodating cavity and impact the second float when in a sloshing condition or the like, and the leakage problem in the dynamic condition is also improved. In addition, the elevated design provides an opened recess in which an air cavity is formed to protect the second valve core assembly in cooperation with the bottom surface of the outer shell so as to reduce oil impingement.

Figure 1:
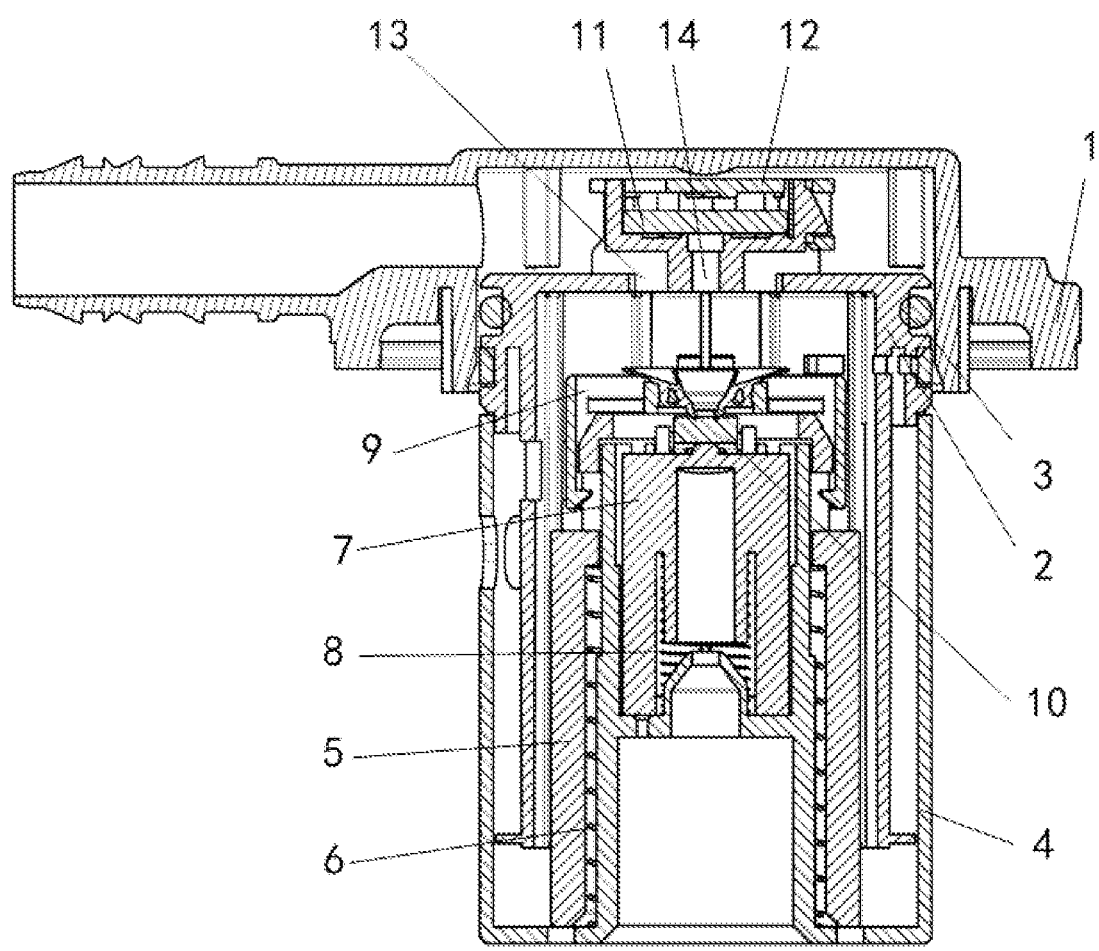
FIG. 1 is a cross-sectional view of a valve of the invention.

Description of Reference Numerals: 1: connecting flange; 2: adapter shell; 201: first guide sliding rail; 202: medium extension ring; 203: small extension ring; 3: sealing ring; 4: outer shell; 401: hollow member; 402: second guide sliding rail; 5: first float; 501: first slide groove; 6: first elastic member; 7: second float; 701: second slide groove; 8: second elastic member; 9: sealing assembly; 901: seal; 9011: large sealing ring; 9012: medium sealing ring; 9013: small sealing ring; 902: slider; 10: movable member; 11: pressure maintaining cap; 12: pressure maintaining shell; 13: first discharge port; 14: second discharge port; 15: first connection port; 16: second connection port; 17: third connection port; 18: fourth connection port; 19: valve core accommodating cavity; 20: elevation structure; 21: stopper; 22: third inflow passage.

DETAILED DESCRIPTION OF THE INVENTION

Hereinafter, a valve, a multi-functional combination valve and a CFLVV valve according to the invention will be described in further detail with reference to the accompanying drawings and specific examples. Advantages and features of the invention will become apparent from the following description and claims.

Example I

The present example is mainly a valve capable of simultaneously achieving a refueling limit valve function and a tumble valve function, and is applied to a fuel tank. The fluid in the fuel tank is oil and gas in the fuel tank.

Referring to FIGS. 1, 2, 4 and 5, the valve of the present example includes a valve body, a valve core, and a pressure maintaining part.

A valve core accommodating cavity 19 is provided in the valve body, and the valve body is provided with a first inflow passage and a second inflow passage which communicate the valve core accommodating cavity 19 with a space outside the valve body, and an inlet of the second inflow passage is higher than an inlet of the first inflow passage. The first inflow passage mainly serves for inflow of oil and gas, and the second inflow passage mainly serves for inflow of gas.

The upper end of the valve body is provided with a first discharge port 13 and a second discharge port 14 communicating with the valve core accommodating cavity 19. The two discharge ports serve for the discharge of the fluid in the valve core accommodating cavity 19. The pressure maintaining part is provided on a top surface of the valve body, and an input end communicates with the second discharge port 14 for defining a pressure required to discharge fluid from the second discharge port 14. The valve core includes a first valve core assembly and a second valve core assembly. The first valve core assembly and the second valve core assembly are vertically slidably connected to the valve core accommodating cavity 19 for opening or closing the first discharge port 13 and the second discharge port 14, respectively.

Here, the opening or closing of the two discharge ports cooperate to achieve the function of the refueling limit valve. That is to say, when the oil liquid continuously flows into the valve core accommodating cavity 19, the gas entering the valve body is discharged from the two discharge ports, and the first discharge port 13 and the second discharge port 14 are sequentially closed according to the inflow amount of the oil liquid so as to avoid leakage caused by oil liquid discharge.

The cooperation of the pressure maintaining part and the first valve core assembly for closing the first discharge port 13 enables the fluid in the valve core accommodating cavity 19 to reach a certain pressure value in order to flow out of the pressure maintaining part to achieve the function of the rolling-over valve. The application of the rolling-over valve is generally in a case where the fuel tank is full or the vehicle has a certain inclination angle, namely, a case where the first valve core assembly is lifted to close the first discharge port 13, but the second valve core assembly is not lifted, and the second discharge port 14 is in an open state. At this moment, due to the arrangement of the pressure maintaining part, the valve as a whole is in a relatively sealed state. Since the oil in the fuel tank may volatilize or the effect of a temperature increase and the pressure inside the fuel tank continuously increases, the function of the rolling-over valve is required to release the pressure. When the pressure in the fuel tank rises to the opening pressure of the pressure maintaining part, the pressure maintaining part is opened and communicated, so that the gas is discharged through the second discharge port 14 and the pressure maintaining part to release the internal pressure.

In this example, the cooperation between the two valve core assemblies can achieve different functions and do not affect each other. Meanwhile, a combination valve with different technical requirements can be obtained by adjusting the performances of the two valve cores respectively, so as to solve the problem of two valve cores affecting each other in the existing combination valve.

The specific structure of the valve of this example is further described below.

In the present example, the cross-sectional area of the first discharge port 13 and the cross-sectional area of the second discharge port 14 are not particularly limited. Based on the functions of the refueling limit valve and the rolling-over valve required by the fuel tank, the opening or closing of the first discharge port 13 and the second discharge port 14 can cooperate to achieve the function of the refueling limit valve, and the opening or closing of the first discharge port 13 cooperates with the pressure maintaining part to achieve the function of the rolling-over valve. Therefore, the cross-sectional area of the first discharge port 13 should be greater than the cross-sectional area of the second discharge port 14. However, the cross-sectional area can actually be determined according to the required technical requirements, and is not specifically defined herein.

In the present example, the valve core part may further include a sealing assembly 9 provided at the top end of the valve core accommodating cavity 19 or vertically sliding in the valve core accommodating cavity 19 for cooperating with the first valve core assembly to open or close the first discharge port 13. The sealing assembly 9 is further provided with a communication passage for communicating with the second discharge port 14 and the second inflow passage for cooperating with the second valve core assembly to open or close the second discharge port 14. Specifically, it can be understood that the purpose of the sealing assembly 9 is to close the first discharge port 13 when the first valve core assembly is elevated to the closed position, and to cooperate with the second discharge port 14 to form a communication passage, so that when the second valve core assembly is lifted, the communication passage can be closed with the cooperation of the sealing assembly 9. Namely, the two valve core assemblies respectively open or close the two discharge ports via the same sealing assembly 9.

A sealing assembly 9 is further provided in the valve body for opening or closing the two discharge ports in cooperation with the two valve core assemblies, respectively, thereby improving the sealing performance of the valve. The sealing assembly 9 can be arranged in a sliding manner in the valve core accommodating cavity 19, or can be fixedly arranged at the two discharge ports. The arrangement manner is flexible, and different arrangements can be used for different technical requirements. Meanwhile, when the sealing effect of the valve is insufficient after a long period of use, only the sealing assembly 9 needs to be replaced.

In the present example, the valve may further include, on the basis of the aforementioned components, a connecting flange 1 for connection to an external line for conducting the gas discharged from the two discharge ports to the external line for treatment. Here, the connecting flange 1 can be sleeved on the valve body, and cooperates with the top surface of the valve body to form a fluid discharge chamber. At this moment, the first discharge port 13 and the pressure maintaining part are located in the fluid discharge chamber for guiding the fluid discharged from the first discharge port 13 and the pressure maintaining part. The connection method between the connecting flange 1 and the valve body can be welding or other fixed connection methods, and a sealing ring 3 is further used for sealing when necessary.

In the present example, the valve body may specifically include an upwardly opened outer shell 4 and a downwardly opened adapter shell 2. The outer shell 4 is sleeved on a lower end of the adapter shell 2 and is fixedly connected to the adapter shell 2. The inner wall surface of the adapter shell 2 cooperates with the inner cavity bottom surface of the outer shell 4 to form a valve core accommodating cavity 19.

Herein, the shell body of the outer shell 4 is provided with at least one first connection port 15. The first connection port 15, the outer wall surface of the adapter shell 2 and the inner wall surface of the outer shell 4 cooperate to form a third inflow passage 22 communicating with the valve core accommodating cavity 19. That is, after the oil enters the interior of the outer shell 4 through the first connection port 15, the oil can flow to the bottom surface of the inner cavity of the outer shell 4 through the gap between the outer shell 4 and the adapter shell 2 under the action of gravity, thereby gradually filling the valve core accommodating cavity 19 and providing the first valve core assembly and the second valve core assembly with rising buoyancy.

The shell body of the adapter shell 2 is provided with at least one second connection port 16 communicating with the valve core accommodating cavity 19, and the first connection port 15 and the second connection port 16 cooperate to form a first inflow passage. The position of the second connection port 16 generally needs to be higher than that of the first connection port 15 to prevent the oil flowing in through the first connection port 15 from entering the valve core accommodating cavity 19 via the second connection port 16. In the event of an increase in the pressure in the fuel tank, the gas enters the valve core accommodating cavity 19 through the first inflow passage and is discharged through the first discharge port 13 and the second discharge port 14 at the top to reduce the pressure in the fuel tank.

At least one third connection port 17 is opened on the outer shell 4. At least one fourth connection port 18 communicating with the valve core accommodating cavity 19 is provided on the shell body of the adaptor shell 2. The third connection port 17, the fourth connection port 18 and the communication passage of the sealing assembly 9 cooperate to form a second inflow passage. Both the third connection port 17 and the fourth connection port 18 need to be higher in height than the first inflow passage, preferably close to the top of the outer shell 4 and the adapter shell 2, so that when the level of oil in the valve core accommodating cavity 19 is higher, the gas in the fuel tank can still flow into the valve core accommodating cavity 19 through the second inflow passage and form a pressure on the pressure maintaining part through the second discharge port 14 to open the pressure maintaining part to discharge the gas. Further, the first connection port 15, the second connection port 16, the third connection port 17 and the fourth connection port 18 may be through-holes provided on the outer shell 4 or the adapter shell 2, respectively. The specific size and shape may be determined according to practical requirements and are not specifically defined herein.

In the present example, the first valve core assembly corresponds to the first discharge port 13, and may specifically include a first float 5 and a first elastic member 6. The first float 5 is slidably connected to the valve core accommodating cavity 19, and the both ends of the first elastic member 6 are respectively connected to the first float 5 and the bottom surface of the valve core accommodating cavity 19. An opening-faced accommodating groove may be provided in the first float 5, so that the first elastic member 6 may extend into the first float 5 to be connected with the first float 5, thereby further reducing the volume of the first valve core assembly.

The second valve core assembly corresponds to the second discharge port 14, and may specifically include a second float 7, a second elastic member 8, and a movable member 10. The second float 7 is slidably connected to the valve core accommodating cavity 19, and both ends of the second elastic member 8 are respectively connected to the second float 7 and the bottom surface of the valve core accommodating cavity 19. The movable member 10 is movably connected to the top surface of the second float 7 for opening or closing the second discharge port 14 in cooperation with the sealing assembly 9, while the combination of the movable member 10 and the second float 7 makes it easier to open the sealed second discharge port 14. Similarly, the second float 7 may be provided with a downward-opening accommodating groove for connecting with the second elastic member 8 to reduce the volume of the second valve core assembly.

Herein, the first elastic member 6 and the second elastic member 8 can both be springs, and the elastic force can be determined according to the weight of the float and the lifting force of the float. In other examples, the two elastic members may be elastic elements such as elastic rubber, which is not particularly limited.

Preferably, the first float 5 can be an annular float. The second float 7 can be a cylindrical float or an annular float with a diameter smaller than the inner diameter of the first float 5. After being slidably connected to the valve core accommodating groove, the first float 5 is sleeved on the second float 7, so as to achieve the full utilization of the inner space of the valve and further reduce the volume of the valve. At this moment, the second discharge port 14 may be a plurality of discharge holes provided on the top surface of the inner cavity of the adaptor shell 2, and the first discharge port 13 may be a plurality of discharge holes surrounding the second discharge port 14.

Figure 3:
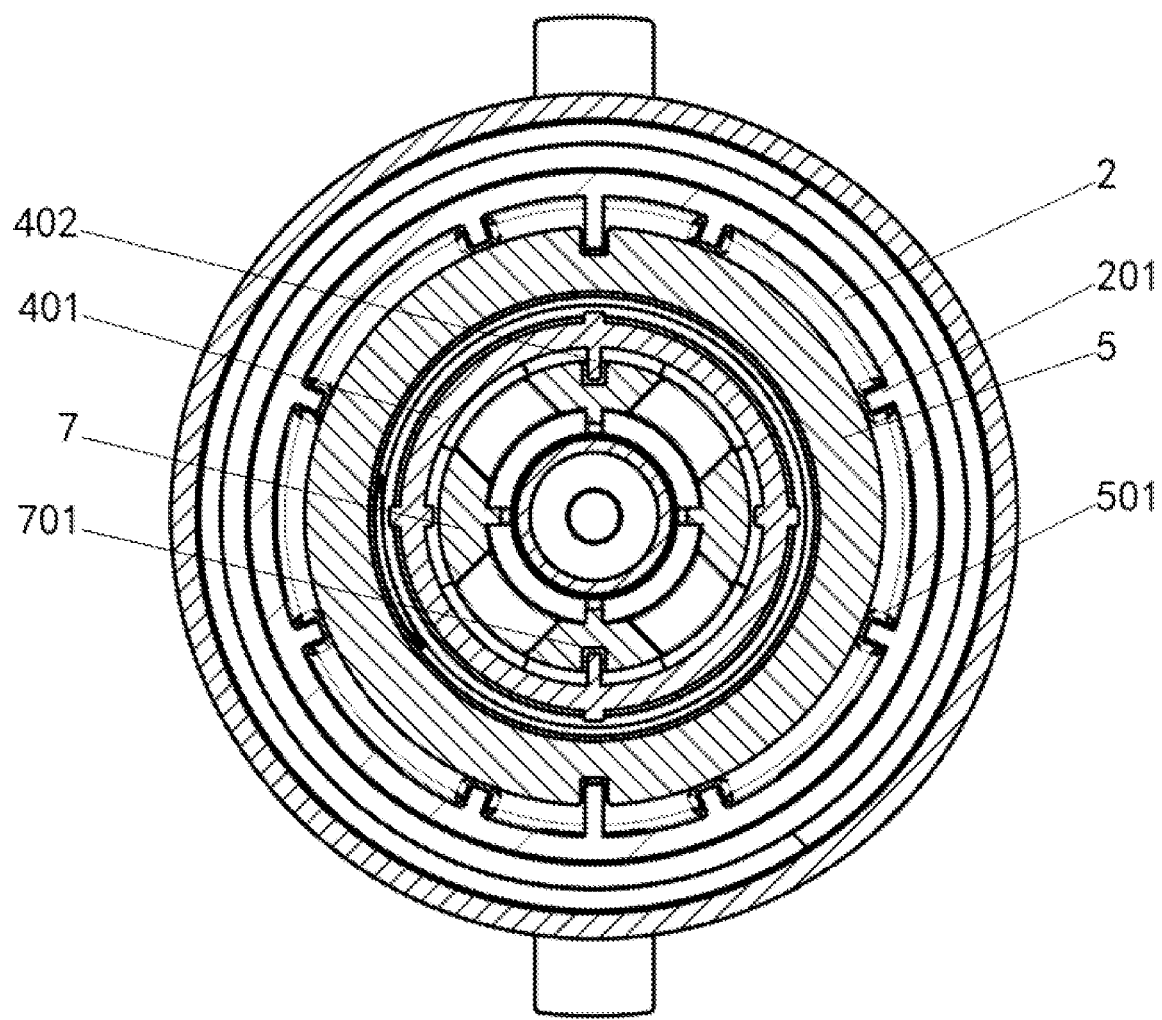
FIG. 3 is a cross-sectional view of a first float and a second float of the valve of the invention.
Figure 4:
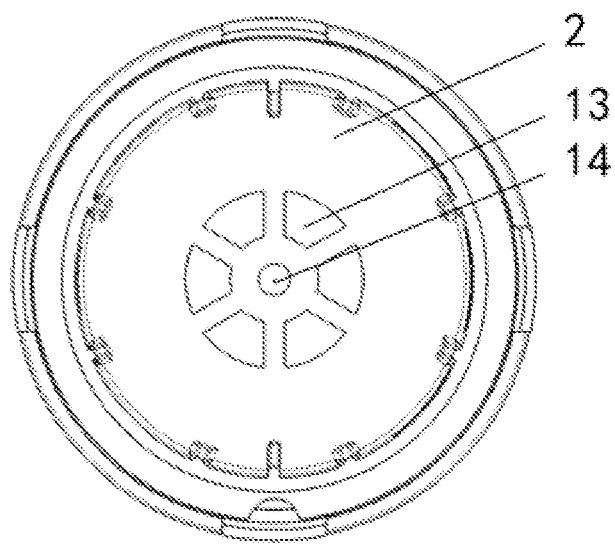
FIG. 4 is a schematic view of a top surface of an adapter shell of the valve of the invention.
Figure 5:
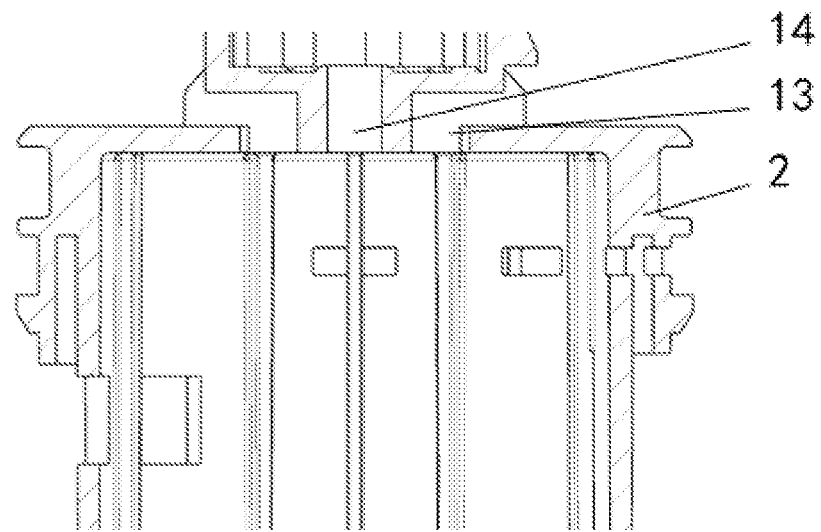
FIG. 5 is a schematic view of a first discharge port and a second discharge port of the valve of the invention.

Referring to FIG. 3, in this example, the first float 5 and the second float 7 are slidably connected with the valve core accommodating cavity 19. The specific connection mode is as follows.

A plurality of vertically arranged first guide sliding rails 201 can be arranged on the inner wall surface of the adaptor shell 2. A corresponding first slide groove 501 is provided on the first float 5, and is slidably connected to the first guide sliding rail 201 via the first slide groove 501.

The sliding mode of the second float 7 is somewhat complicated. Since the first float and the second float 7 does not affect each other, but the second float 7 needs to be arranged in the inner ring of the first float 5, a hollow member 401 needs to be arranged on the bottom surface of the inner cavity of the outer shell 4. The hollow member 401 cooperates with the bottom surface of the inner cavity to form a vertical guide groove. Several vertically arranged second guide sliding rails 402 are arranged on the inner wall surface of the hollow member 401. The second float 7 is provided with a corresponding second slide groove 701 and is slidably connected to the second guide sliding rail 402.

In practical implementation, the amount of movement of the valve core assembly can be defined by designing the mating clearance of the sliding joint. At the same time, the contact area between the valve core assembly and the parts in contact during the movement can be reduced to decrease the friction between each other, so that the valve core assembly is more flexible and easy to open or close the corresponding discharge port during the movement.

Further, the slide rail and the slide groove are also interchangeable. Taking the first float 5 as an example, the first slide groove 501 may be provided on the inner wall surface of the adapter shell 2, and the first guide slide rail 201 may be provided on the first float 5.

In the present example, the pressure maintaining part specifically includes a pressure maintaining shell 12 and a pressure maintaining cap 11. An accommodating space is provided in the pressure maintaining shell 12 which is further provided with an inflow hole and a discharge hole communicating with the accommodating space. The pressure maintaining shell 12 is provided on the top surface of the valve body, and the inflow hole communicates with the second discharge port 14. The pressure maintaining cap 11 is slidably connected to the accommodating space for opening or closing the inflow hole. That is to say, the pressure maintaining cap 11 is pressed on the inflow hole of the accommodating space by its own gravity so as to close the inflow hole. After the pressure of the gas in the valve core accommodating cavity 19 reaches a value which can counteract the gravity of the pressure maintaining cap 11, the pressure maintaining cap 11 can be pushed to rise, so that the gas can enter the accommodating space through the inflow hole and be discharged to the fluid discharge chamber formed by the connecting flange 1 through the discharge hole.

Example II

Figure 6:
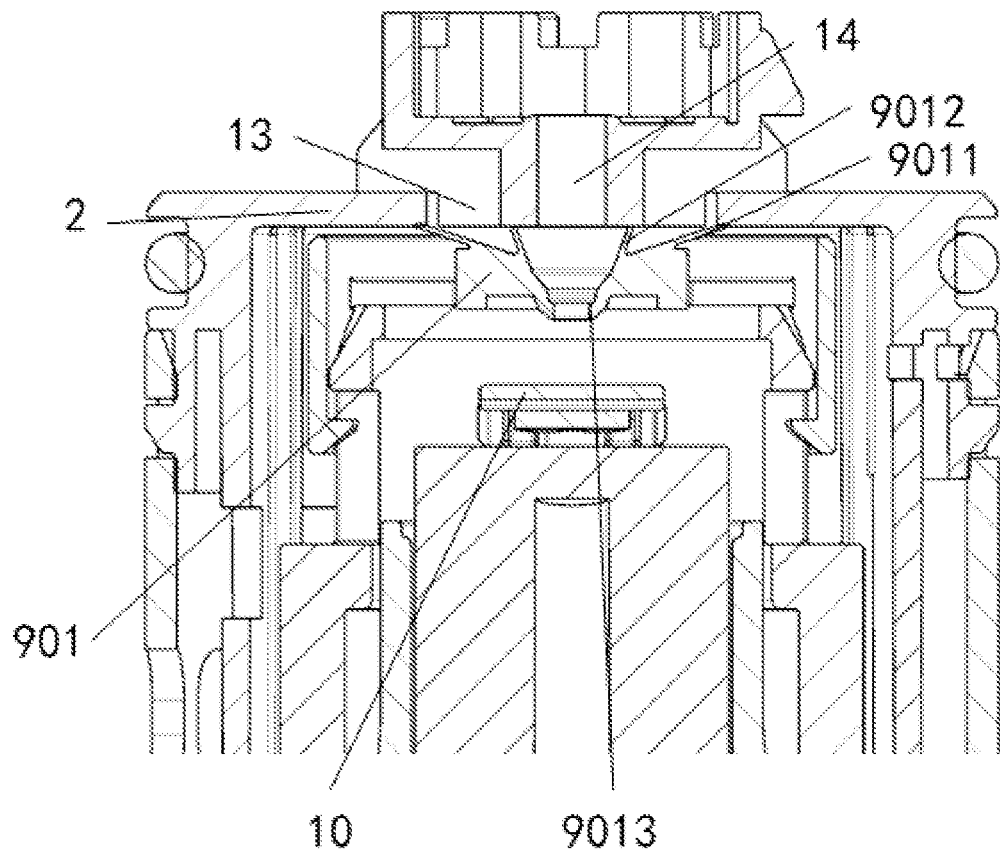
FIG. 6 is a schematic view of a seal of the valve of the invention.
Figure 7:
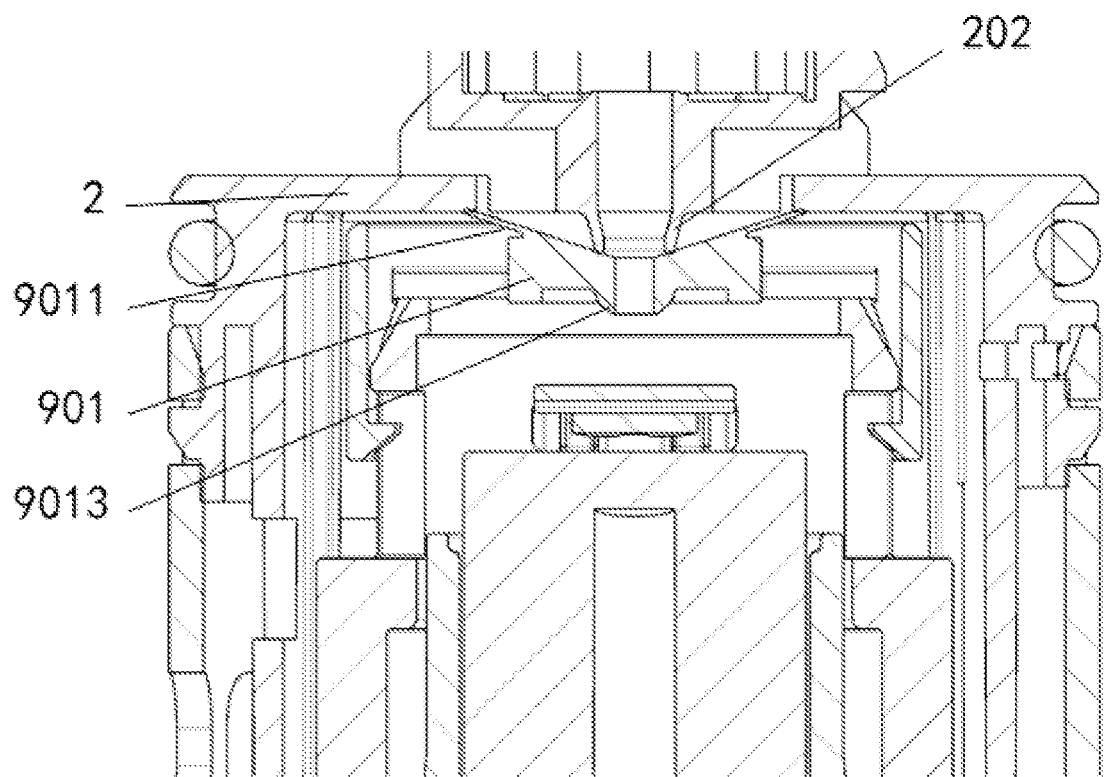
FIG. 7 is another schematic view of the seal of the valve of the invention.
Figure 8:
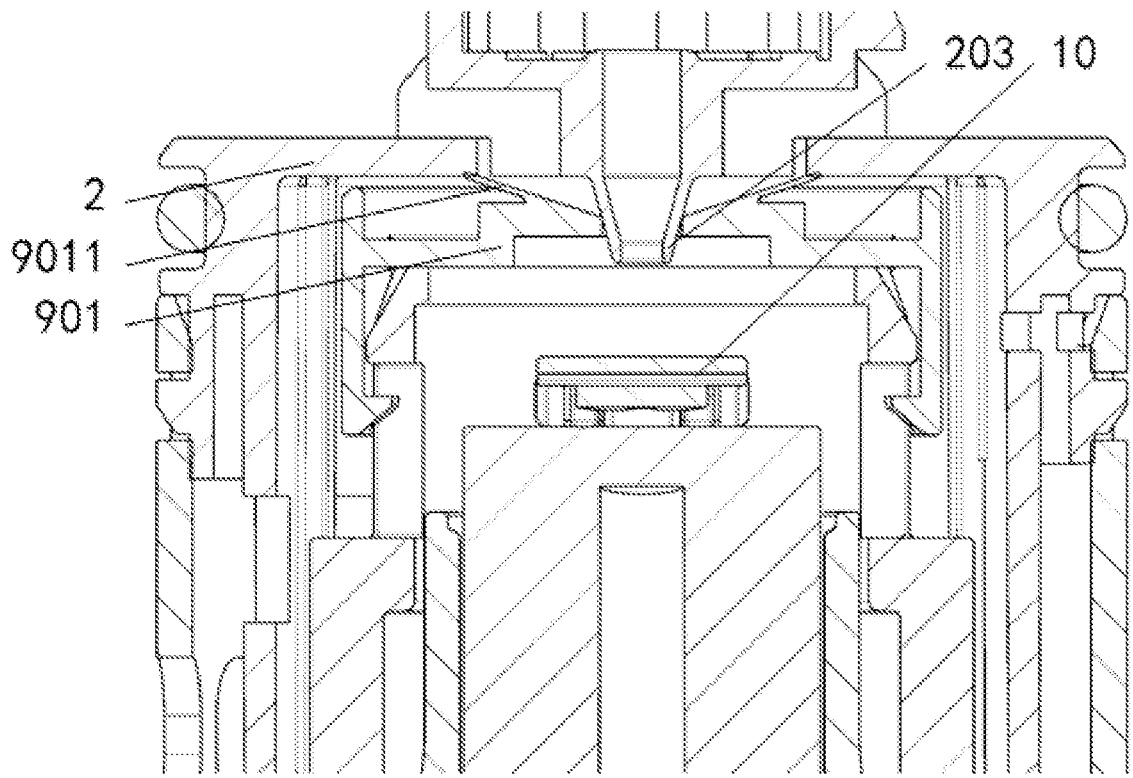
FIG. 8 is another schematic view of the seal of the valve of the invention.

With reference to FIGS. 6 to 8, this example further describes several preferred implementations of the sealing assembly 9 on the basis of example I described above. In this example, the sealing assembly 9 can be specifically divided into two arrangements, the first one being arranged on the top surface of the inner chamber of the valve core accommodating cavity 19 and the second one being slidably connected in the valve core accommodating cavity 19.

First, the first case is described as follows.

The sealing assembly 9 may be embodied as a plurality of seals 901 respectively sleeved at the first discharge port 13 and the second discharge port 14. Each of the seals 901 extends into the valve core accommodating cavity 19 with a sealing ring which may respectively communicate with the valve core accommodating cavity 19 at the first discharge port 13 or the second discharge port 14. At this moment, the first float 5 is lifted to contact and seal with a sealing ring corresponding to the first discharge port 13, and the valve core accommodating cavity 19 is separated from the first discharge port 13 to close the first discharge port 13. Likewise, when the second float 7 is lifted, the second float 7 can contact and seal with a sealing ring corresponding to the second discharge port 14. The valve core accommodating cavity 19 is separated from the second discharge port 14, so as to close the second discharge port 14.

Next, a description will be given of the second case, which can be implemented in many ways. Thus, a description will be given based on a partial example of the case where the first float 5 is sleeved on the second float 7 and the first discharge port 13 and the second discharge port 14 have the same circle center in the above-mentioned first example, so as to facilitate understanding.

Specifically, the overall idea is that the sealing assembly 9 includes a slider 902 for sliding connection with the valve core accommodating cavity 19 and a seal 901 arranged on the slider 902 for switching the two discharge openings in cooperation with the two floats. Here, the slider 902 and the seal 901 may be separated and assembled together or may be integrally formed. The structure of the slider 902 part is more conventional, and the following is mainly a description of the specific arrangement of the seal 901.

Embodiment 1: the seal 901 is an annular seal 901 of which an inner ring corresponds to the second discharge port 14. A large sealing ring 9011 and a medium sealing ring 9012 are provided on an upper end surface of the annular seal 901.

The radius of the large sealing ring 9011 needs to be larger than the maximum radius of the first discharge port 13. The radius of the medium sealing ring 9012 needs to be smaller than the minimum radius of the first discharge port 13 and the maximum radius of the second discharge port 14. This is provided to ensure that when the seal 901 is in the closed position, it is closely attached to the wall surfaces of the adaptor shell 2 on the inside and outside of the first discharge port 13 so to achieve the sealing to the first discharge port 13.

When the first discharge port 13 is sealed, the second discharge port 14 communicates with the valve core accommodating cavity 19 through the inner ring of the annular seal 901. In order to seal the second discharge port 14, a small sealing ring 9013 having a radius larger than that of the inner ring of the annular seal 901 is provided on the lower end surface of the annular seal 901. The small sealing ring 9013 may come into contact with the top surface of the second float 7 when the second float 7 rises so as to seal the second discharge por 14.

Embodiment II: this embodiment is a modification of the embodiment 1 described above, and the seal 901 is likewise an annular seal 901. The large sealing ring 9011 and the small sealing ring 9013 is provided in the same manner, and the medium sealing ring 9012 is removed. Specifically, a medium extension ring 202 is provided on the wall surface of the top surface of the inner cavity of the adaptor shell 2 between the first discharge port 13 and the second discharge port 14. A lower end of the medium extension ring 202 is used to contact the upper end surface of the annular seal 901. The annular seal 901, when moved to the closed position, mates with the large sealing ring 9011 to effect a seal against the first discharge port 13, and also mates with the inner ring of the annular seal 901 to effect communication of the second discharge port 14 with the valve core accommodating cavity 19. The sealing manner of the small sealing ring 9013 is the same as that of embodiment 1, and will not be described in detail.

Embodiment III: this example is also a modification of the embodiment 1 described above, and the seal 901 is also an annular seal 901. The medium sealing ring 9012 and the small sealing ring 9013 are provided in the same manner, and the large sealing ring 9011 is removed. Specifically, a large extension ring is provided on the wall surface of the inner cavity top surface of the adaptor shell 2 outside the first discharge port 13, and the lower end of the large extension ring is used to contact the upper end surface of the annular seal 901. The annular seal 901, when moved to the closed position, mates with the medium sealing ring 9012 to effect a seal against the first discharge port 13. The sealing manner of the medium sealing ring 9012 and the small sealing ring 9013 to the second discharge port 14 is the same as that of Embodiment I and will not be described in detail.

Embodiment IV: this embodiment is also a modification of Embodiment I described above, and the seal 901 is also an annular seal 901. The small sealing ring 9013 is provided in the same manner, and the large sealing ring 9011 and the medium sealing ring 9012 are removed. Specifically, a large extension ring is provided on the wall surface of the inner cavity top surface of the adaptor shell 2 outside the first discharge port 13, and the lower end of the large extension ring is used to contact the upper end surface of the annular seal 901. A medium extension ring 202 is provided on the wall surface of the top surface of the internal cavity of the adaptor shell 2 between the first discharge port 13 and the second discharge port 14. A lower end of the medium extension ring 202 is also used to contact the upper end surface of the annular seal 901. The large and medium extension rings 202 cooperate with the annular seal 901 to effect a seal against the first discharge port 13 when the annular seal 901 is moved to the closed position. The small sealing ring 9013 seals the second discharge port 14 in the same manner as Embodiment I, which will not be described in detail.

Embodiment 5: this embodiment is a modification of Embodiment I described above, and the seal 901 is likewise an annular seal 901. The large sealing ring 9011, the medium sealing ring 9012, and small sealing ring 9013 are all removed. Specifically, a large extension ring is provided on the wall surface of the inner cavity top surface of the adaptor shell 2 outside the first discharge port 13, and the lower end of the large extension ring is used to contact the upper end surface of the annular seal 901. A small extension ring 203 is provided on the wall surface of the top surface of the inner cavity of the adaptor shell 2 between the first discharge port 13 and the second discharge port 14. The diameter of the upper end of the small extension ring 203 is greater than the diameter of the inner ring of the annular seal 901. The diameter of the lower end of the small extension ring 203 is less than the diameter of the inner ring of the annular seal 901, namely, the outer side wall of the small extension ring 203 is used for contacting with the inner ring of the annular seal 901. The annular seal 901, when moved to the closed position, mates with the small extension ring 203 and the large extension ring to effect a seal against the first discharge port 13. The lower end of the small extension ring 203 then cooperates with the upper surface of the small float to seal the second discharge port 14.

Of course, in other examples, the sealing assembly 9 may also be provided on the first float 5 and the second float 7, directly cooperating with the first discharge port 13 and the second discharge port 14 for sealing. The specific embodiment is numerous and not specifically limited herein.

Example III

Figure 2:
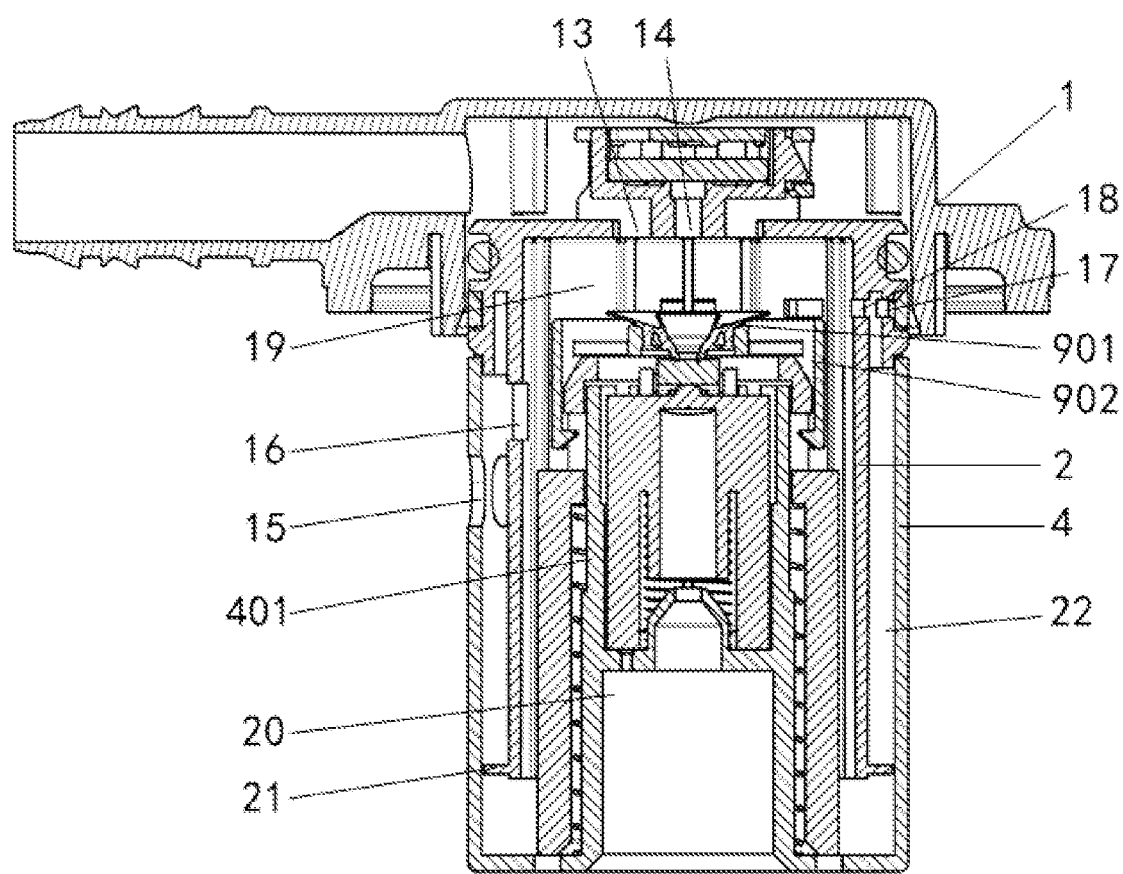
FIG. 2 is another cross-sectional view of the valve of the invention.

Referring to FIG. 2, this example is a further improvement of the structure of the third inflow passage 22 in Example I described above.

Specifically, the present example is exemplified in that the inner side wall of the outer shell 4 and the outer side wall of the adapter shell 2 are circular, but the arrangement of the outer shell 4 and the adapter shell 2 may be various and is not particularly limited.

The overall idea is that the third inflow passage 22 is provided with a stopper 21 to restrict the flow area of the third inflow passage 22. When the inflow pressure of the oil is constant, the flow of the oil into the valve core accommodating cavity 19 decreases.

In particular, the stopper 21 may be an annular stopper provided on the inner side wall of the outer shell 4, and the diameter of the inner ring of the annular stopper 21 is greater than the diameter of the outer side wall of the adapter shell 2, so as to form a gap between the annular stopper and the adapter shell 2. The cross-sectional area of the gap is the flow area of the third inflow passage 22 herein. The diameter of the inner ring of the annular stopper can be varied according to the size of the flow area required, or the flow area can be varied by opening holes directly in the annular stopper. There are many specific embodiments, which are not specifically limited herein.

In another embodiment, the stopper 21 may be an annular stopper arranged on the outer side wall of the adapter shell 2, the diameter of the outer ring of the annular stopper being smaller than the diameter of the inner side wall of the outer shell 4, so as to form a gap between the annular stopper and the outer shell 4. The cross-sectional area of the gap is the flow area of the third inflow passage 22 herein. The diameter of the outer ring of the annular stopper can be varied according to the size of the flow area required, or the flow area can be varied by opening holes directly in the annular stopper. There are many specific embodiments, which are not specifically limited herein.

In another embodiment, the stopper 21 can be an annular stopper with an outer ring and an inner ring respectively connected to the inner side wall of the outer shell 4 and the outer side wall of the adapter shell 2, and a hole is directly opened on the annular stopper. There are many specific embodiments in which the flow area can be changed by the area and number of the holes, which is not specifically limited herein.

In other embodiments, a plurality of stoppers 21 may be provided on the inner side wall of the outer shell 4 or the outer side wall of the adapter shell 2 or simultaneously connected to the outer shell 4 and the adapter shell 2. The shape of the stoppers 21 may also be various. The cross-sectional area of the gap formed between the plurality of stoppers 21 and the adapter shell 2 is the flow area of the third inflow passage 22 therein.

This example provides a stopper 21 on the third inflow passage 22, which acts to provide a relative separation between the external fluid and the internal valve core when a volume of fluid enters the valve core accommodating cavity 19 through the third inflow passage 22, thereby providing isolation to the fluid and preventing the valve core assembly from prematurely closing due to a large flush of fluid. In addition, in severe conditions such as a large amplitude of sloshing, the fluid will enter the valve core accommodating cavity 19 through the third inflow passage 22 due to sloshing. In this case, the design of the stopper 21 will also make the fluid relatively isolated from the valve core accommodating cavity 19, and less fluid will enter the valve core accommodating cavity 19, reducing the impact of sloshing conditions on the valve core assembly. At the same time, less fluid will enter the valve core accommodating cavity 19, and the probability of fluid leakage from the valve body in the dynamic process will be greatly reduced.

Example IV

Referring to FIG. 2, this example is a further improvement of the bottom surface structure of the outer surface of the outer shell 4 in Example I described above.

Specifically, the main purpose of the improved design of this example is to slow down the influence of the oil on the second float 7, avoiding that the second float 7 is prematurely lifted due to the impact of the oil so that the second discharge opening 14 is prematurely closed.

Thus, the present example alleviates the problem of the second float 7 lifting due to oil impact by raising the lowest height of the second float 7.

In particular, an elevation structure 20 can be provided on the bottom surface of the cavity of the outer shell 4. The elevation structure 20 matches the position of the second float 7, with the height determined according to the specific technical requirements for the second float 7. The hollow member 401 is mounted on the top surface of the elevation structure 20 so that the lowest height of the second float 7 is the top surface of the elevation structure 20, and oil needs to rise to the top surface of the elevation structure 20 to affect the second float 7.

The elevation structure 20 may be a pad, which may be a hollow structure to further reduce the overall weight of the valve. The elevation structure 20 may also be a recess provided on the bottom surface of the outer surface of the outer shell 4 and form a recess cavity, i.e., a protrusion on the bottom surface of the cavity from the perspective of the cavity. The hollow member 401 mounted on the protrusion also allows the lowest position of the second float 7 to be moved upwards. With respect to the provision of the elevation structure 20 directly within the internal cavity, the provision of the recess cavity may cooperate with the bottom surface of the outer shell 4 to form an air cavity so as to provide a protective effect to the second valve core assembly in the event of an oil impact. Specifically, the hollow structure may be a hollow shell body. At the same time, a hollow structure may be provided on the hollow shell body, so that the oil entering the valve core accommodating cavity 19 can flow into the hollow shell body. Thus, the oil entering the valve core accommodating cavity 19 needs to be further increased and filled with the hollow shell body before having an effect on the corresponding second float 7 mounted on the top surface of the hollow shell body, further alleviating the problem of the second float 7 being closed due to the impact of the oil.

In other examples, the hollow structure may also be a plurality of posts vertically arranged on the bottom surface of the valve core accommodating cavity 19. The hollow member 401 is mounted on the top ends of these posts, and the space between the posts is the space inside the hollow shell body as described above. Also, the problem that the second float 7 is closed due to the oil impact can be further alleviated.

The elevation structure 20 may also be a recessed groove provided on the outer bottom surface of the outer shell 1, and forms a recess cavity, i.e., a protrusion on the bottom surface from the perspective of the valve core accommodating cavity 19. The hollow member 401 mounted on the protrusion also allows the lowest position of the second float 7 to be moved upwards. With respect to the provision of the pad directly in the valve core accommodating cavity 19, the provision of the recessed groove may form an air cavity in cooperation with the bottom surface of the outer shell 1, so as to have a protective effect on the second float 7 in the event of an oil impact.

Both the refueling limit valve and the rolling-over valve have a theoretical closing height. That is to say, when the liquid level inside the fuel tank rises to a certain level, the float inside the refueling limit valve and the rolling-over valve will rise until the exhaust passage is closed. However, when the liquid level rises to close the exhaust passage of the refueling limit valve, it is necessary to ensure that the rolling-over valve will not be closed because it is necessary to release the pressure inside the fuel tank by means of the exhaust passage of the rolling-over valve, so that the closing height of the rolling-over valve generally needs to be designed relatively upward to ensure that the rolling-over valve is in an open state after the refueling limit valve is closed.

By the provision of the recess concaved upwards in the bottom of the outer surface of the outer shell 4 or by the provision of the pad directly in the inner cavity, an elevated design is provided in this example, raising the lowest sliding position of the second float 7, so that the fluid entering the valve core accommodating cavity 19 has to reach a certain level before the second float 7 is sufficiently buoyant and elevated, avoiding the situation where the second float 7 is lifted prematurely to close the second discharge port 14. At the same time, the elevated design also ensures that after the refueling limit valve function is closed, the rolling-over valve function is in an open state, i.e., after the first discharge port 13 is closed, the second discharge port 14 is not closed. In addition, since the second float 7 is at a higher position, relatively less fluid can enter the valve core accommodating cavity 19 and impact on the second float 7 when in a sloshing condition or the like, and the leakage problem in a dynamic situation is somewhat improved. In addition, the elevated design provides an opened recess in which an air cavity is formed to protect the second valve core assembly in cooperation with the bottom surface of the outer shell 4 so as to reduce oil impingement.

Example V

With reference to FIG. 1, this example is a further explanation of the specific structure of the pressure maintaining part in Example I.

Specifically, the design idea of the pressure maintaining part is to design a component that requires a certain pressure to open at the second discharge port 14 when a certain pressure value is reached in the fuel tank so that gas is discharged from the second discharge port 14. Therefore, the pressure maintaining part is specifically provided as a pressure maintaining shell 12 and a pressure maintaining cap 11. The pressure maintaining shell 12 serves as a connector for connecting to the second discharge port 14, and an accommodating space is left inside. The pressure maintaining cap 11 is provided in the accommodating space to keep the inflow port closed by its own gravity at the inflow port covered on accommodating space communicating and communicating with the second discharge port 14, and the inflow port is maintained closed by its own gravity. When the pressure in the valve core accommodating cavity 19 is greater than or can counteract the weight of the pressure maintaining cap 11, the pressure maintaining cap 11 is lifted and gas can be discharged. At the same time, a plurality of flow passages may be opened on the inner wall surface of the accommodating space, so that after the pressure maintaining cap 11 is lifted, the inflow gas can flow through the flow passage to the discharge hole and be discharged out.

Further, it is provided that one end of the elevation tube is mounted on the valve body and communicates with the second discharge port 14. The other end of the elevation tube is connected to the pressure maintaining shell 12 and communicates with the inflow hole. The pressure maintaining shell 12 forms, by cooperation between the elevation tube and the valve body, a large exhaust passage communicating with the first discharge port 13 for exhausting the gas exhausted from the first discharge port 13.

Further, the pressure maintaining cap 11 may be made of a heavy material or may be made of a light material in cooperation with the elastic member. When an elastic member is used, both ends of the elastic member are respectively connected to an upper end of the pressure maintaining cap 11 and a top surface of the accommodating space. The pressing force required for closing the inflow port is formed by the elastic force of the elastic member cooperating with the gravity force of the pressure maintaining cap 11.

Further, the pressure maintaining shell 12 may be provided with a plurality of extension pieces for fixedly connecting with the valve body. For example, a plurality of connecting posts or connecting pieces may be provided, and the both ends are respectively connected with the outer surfaces of the valve body and the pressure maintaining shell 12, so as to further enhance the firmness of the connection between the pressure maintaining shell 12 and the valve body.

Figure 17:
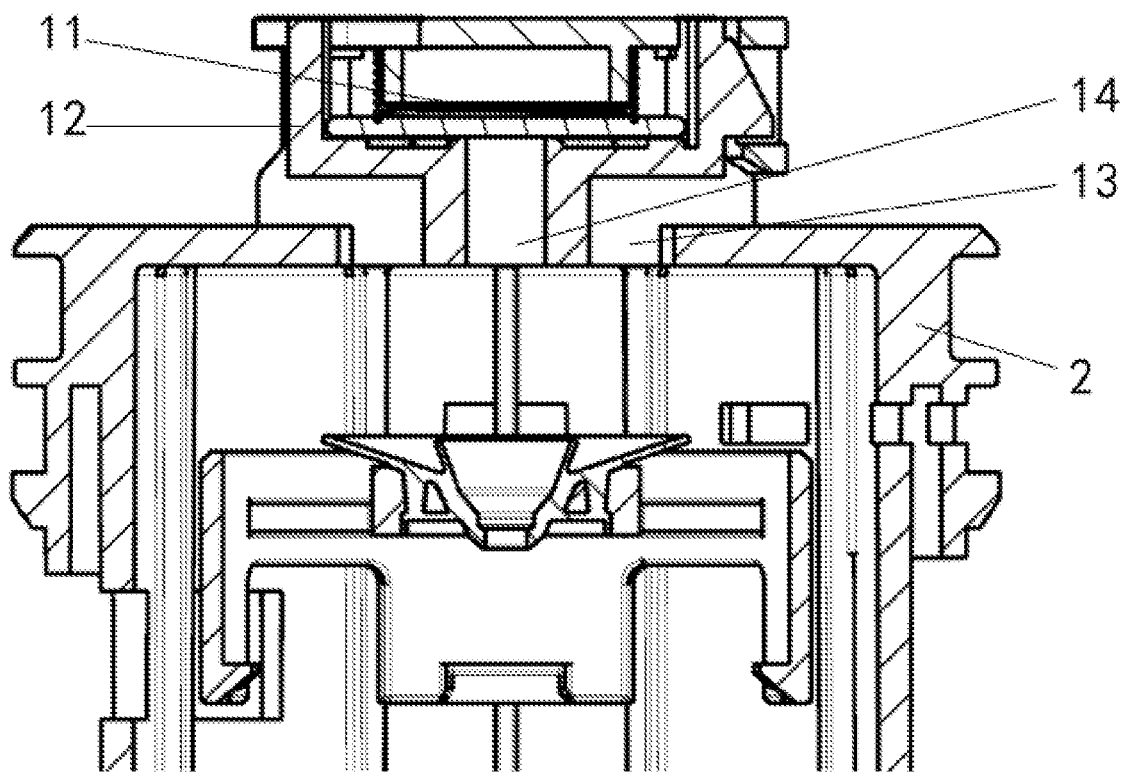
FIG. 17 is a schematic view of an alternative scheme of a pressure maintaining part of the valve of the invention.

In the present example, the sliding mode between the pressure maintaining cap 11 and the accommodating space of the pressure maintaining shell 12 may be the cooperation of a slide groove and a sliding rail. How the slide groove and the sliding rail are specifically arranged on these two components may not be specifically defined. Referring to FIG. 17, when the height of the fluid discharge chamber formed by the cooperation of the valve body and the connecting flange 1 is low, the thickness of the pressure maintaining shell 12 can be designed to be thinner, and the width of the pressure maintaining shell 12 becomes large. Since the amount of exhaust gas at the first discharge port 13 is large when functioning as a refueling limit valve, a sufficiently large flow area is required. In order to prevent the pressure maintaining shell 12 from being too wide to interfere with the first discharge port 13 so that the flow area of the first discharge port 13 is reduced, an elevation tube may be provided at the bottom of the pressure maintaining shell 12. Both ends of the elevation tube are in communication with the inflow port and the second exhaust port 14, respectively, so that the height of the bottom surface of the pressure maintaining shell 12 is elevated so as not to interfere with the top surface of the adapter shell 2, thereby not affecting the first discharge port 13.

Figure 18:
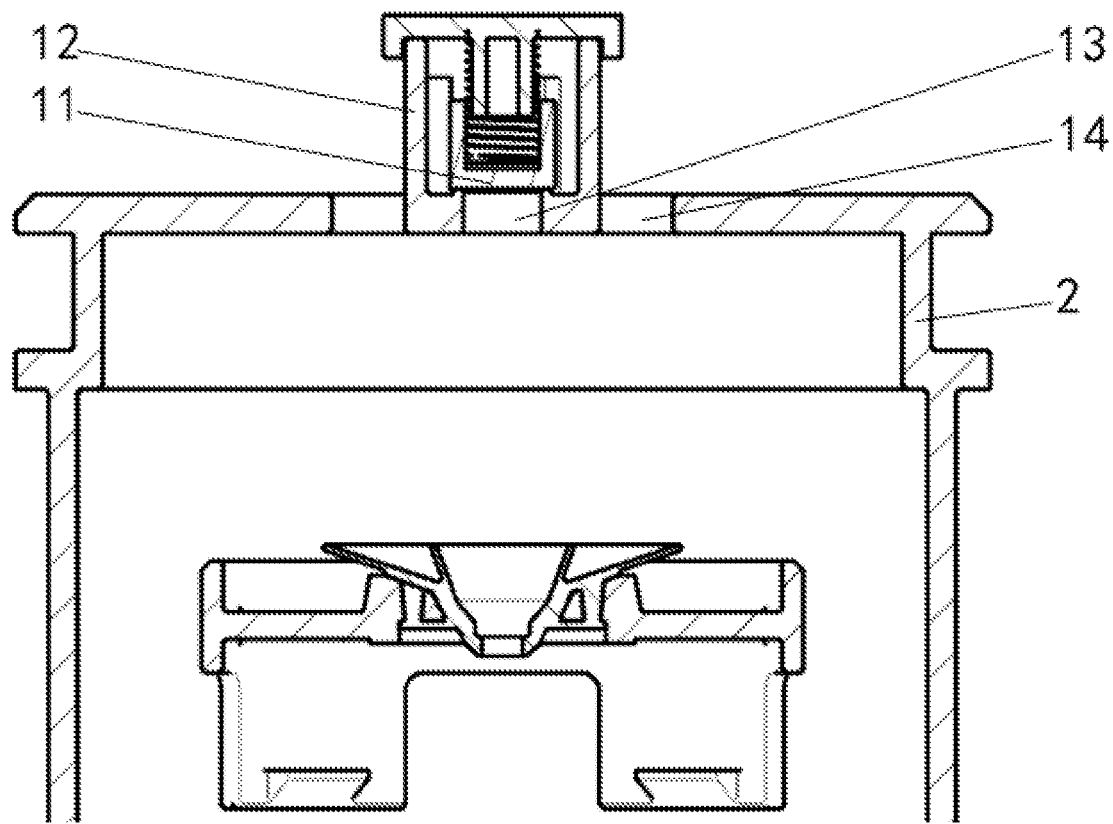
FIG. 18 is a schematic view of another alternative scheme of a pressure maintaining part of the valve of the invention.

Referring to FIG. 18, when the height of the fluid discharge chamber is high, the width of the pressure maintaining shell 12 can be designed to be smaller than the minimum diameter of the first discharge port 13, so that the inflow port can be directly connected to the second discharge port 14 without the extension pipe. In this design, the volume of the accommodating space is smaller, and the volume of the pressure maintaining cap 11 that can be accommodated is also smaller. Thus, the way that the pressure maintaining cap 11 cooperates with the elastic member is more suitable for this design.

Example VI

Figure 15:
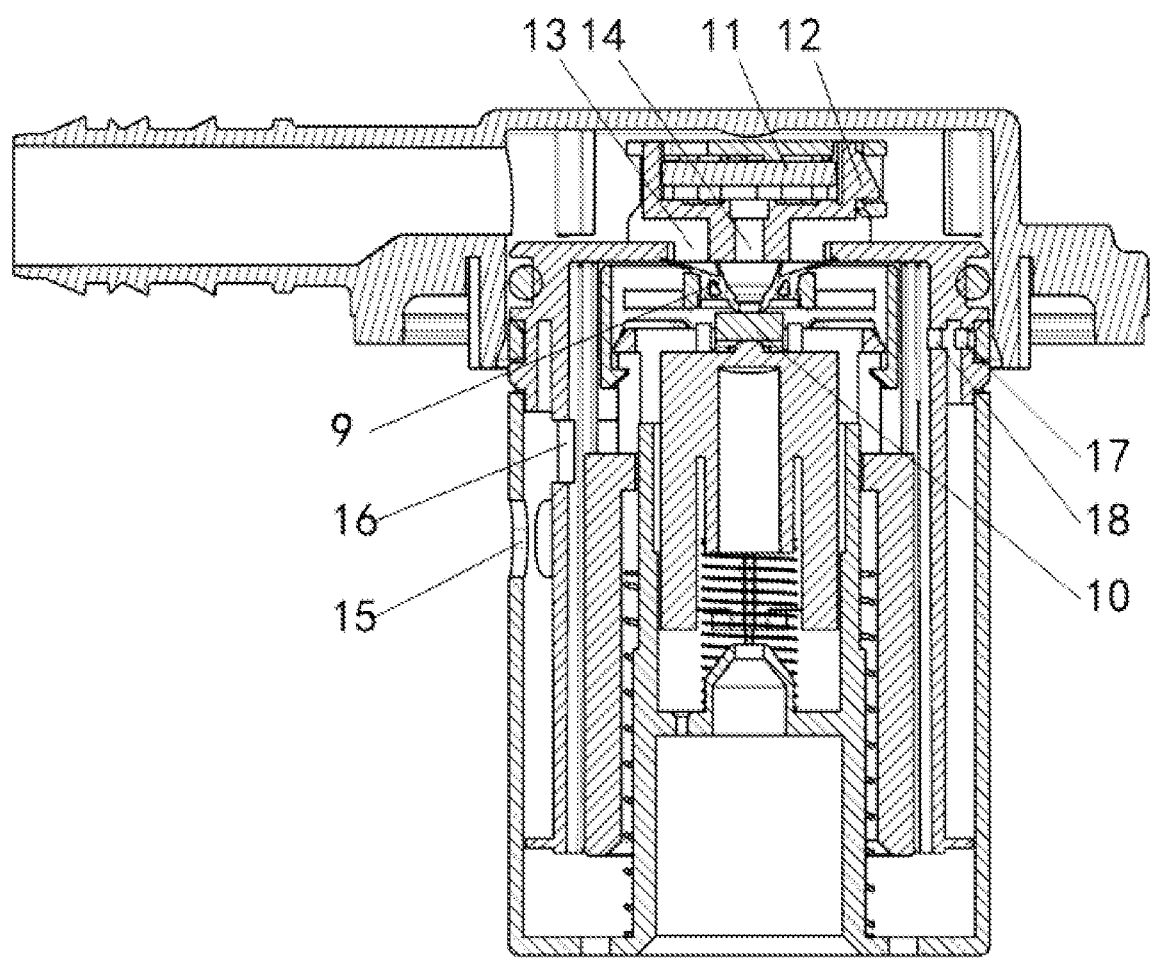
FIG. 15 is a schematic view of another operation mode of the valve of the invention.

Referring to FIGS. 1 and 15, this example is a further explanation of the specific structure of the movable member 10 in Example I described above.

Specifically, the movable member 10 is fitted with a second float 7, which can make a certain vertical axial movement in the valve core accommodating cavity 19. The assembly method of the movable member 10 and the second float 7 can be a "hinge-type" rotary shaft structure, so that the movable member 10 can perform a rotary motion along the axis of one side. It is also possible to have an "inclined plate" configuration, in which the movable element 10 is mounted on the second float 7 with its top surface at an angle to the horizontal.

Further, the movable member 10 is rotatably connected to the top surface of the second float via a rotary shaft, forms a certain angle with the axis under the action of the second float 7 and its own gravity, performs breathing exhaust from one side to form an opening with the communication passage formed by the second discharge port and the sealing assembly. A ventilation channel is formed under high pressure, thereby releasing the pressure in the fuel tank.

Herein, the movable member 10 is used for the purpose that when the whole valve core, i.e., the first valve core assembly and the second valve core assembly are in a closed position, so that the first discharge port 13 and the second discharge port 14 are closed. A certain pressure may be suffocated in the fuel tank in some cases. At least one of the two valve cores is required to be opened in time, so as to discharge the pressure in the fuel tank. Since $P=F/S$, it can be seen that when F is constant, the larger S is, the smaller P is. That is to say, when there is a higher pressure in the fuel tank, since the cross-sectional area S of the first discharge port 13 is usually larger, the first discharge port 13 will be opened at a lower pressure, and then second discharge port 14 needs to be opened in time to discharge the pressure in the fuel tank. The combination of the movable member 10 and the second float 7 is such that it can be opened more easily after sealing with the small hole so as to achieve pressure relief in the fuel tank. The combined structure of the movable member 10 and the second float 7 can therefore be varied, with the aim of achieving an easier re-opening function of the small hole. Alternatively, the movable member 10 can be eliminated and the easy re-opening function can be achieved by making some structure on the second float 7.

Example VII

A multi-functional combination valve according to this example includes the valve according to any one of the above examples. This example can achieve the function of the refueling limit valve and the function of the rolling-over valve through the cooperation between the two valve core assemblies, without influence on each other. At the same time, a valve with different technical requirements can be obtained by adjusting the performances of the two valve cores respectively, so as to solve the problem of two valve cores affecting each other in the existing valve.

The operation of the multi-functional combination valve in various operating conditions is described below.

Figure 9:
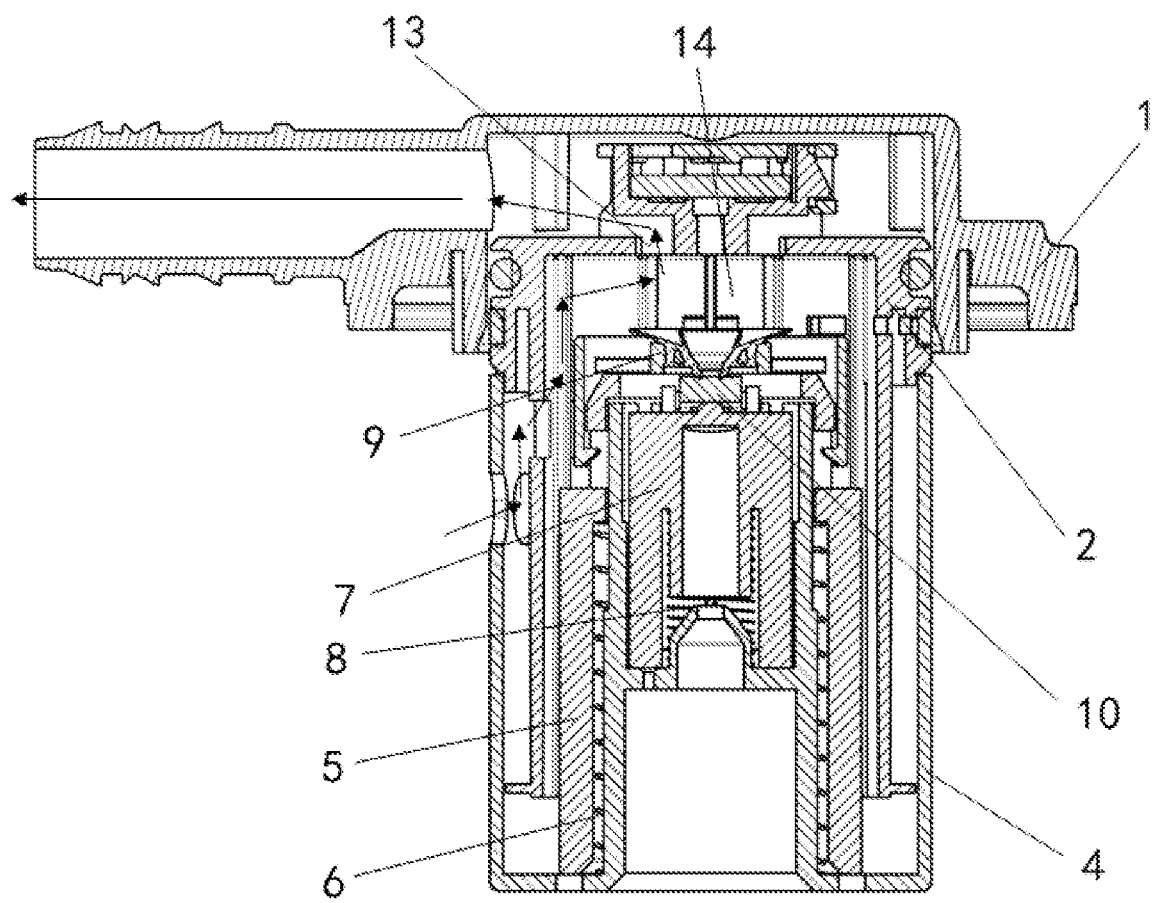
FIG. 9 is a schematic view of an operation mode of the valve of the invention.

1. Referring to FIG. 9, the fuel tank performs a refueling limit valve venting function via a valve. This situation is generally in a state where the fuel inside the fuel tank is not full, or it can be understood that the fuel inside the fuel tank does not excessively flood the first float 5 and the second float 7. At this moment, both the floats are in a falling state. The sealing assembly 9 does not form a seal with the first discharge port 13 and the second discharge port 14. At this moment, the gas inside the fuel tank can be discharged through the first discharge port 13, and the valve functions as a refueling limit valve.

Figure 10:
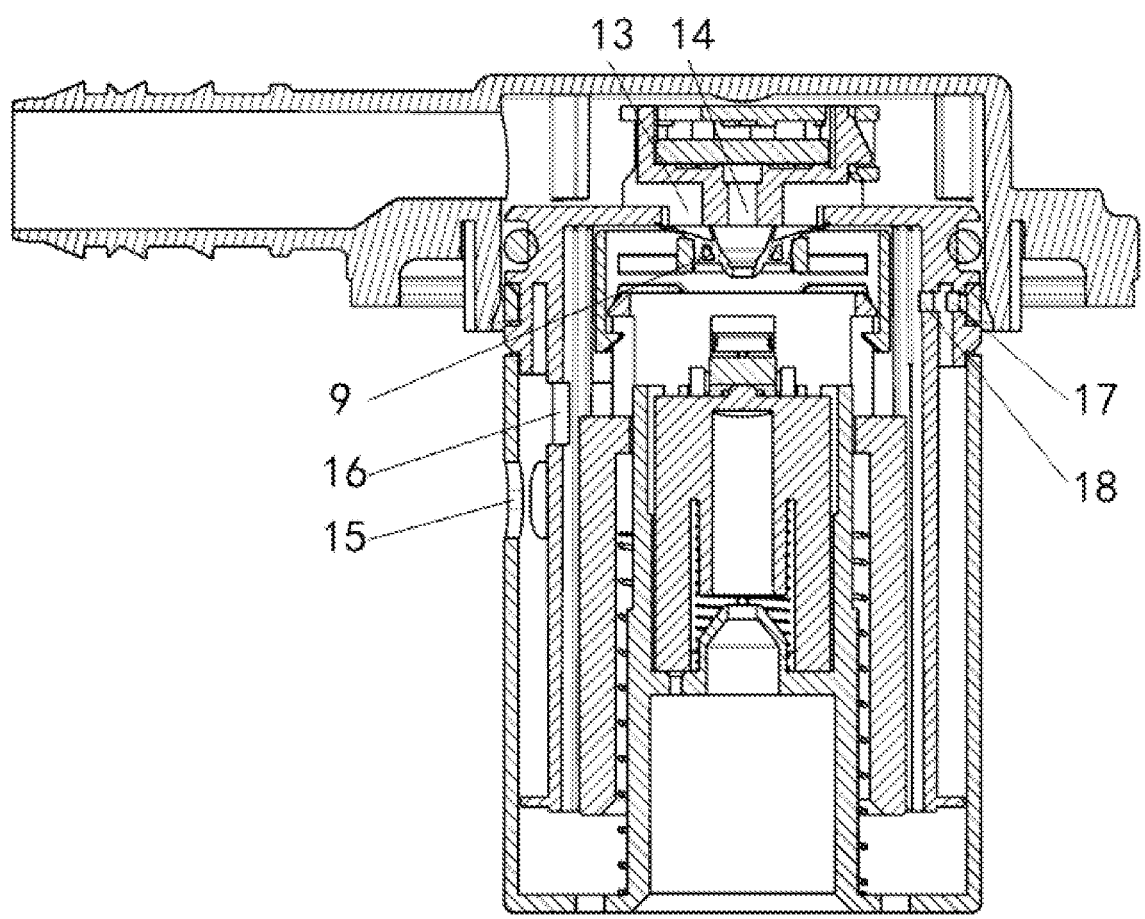
FIG. 10 is a schematic view of another operation mode of the valve of the invention.
Figure 11:
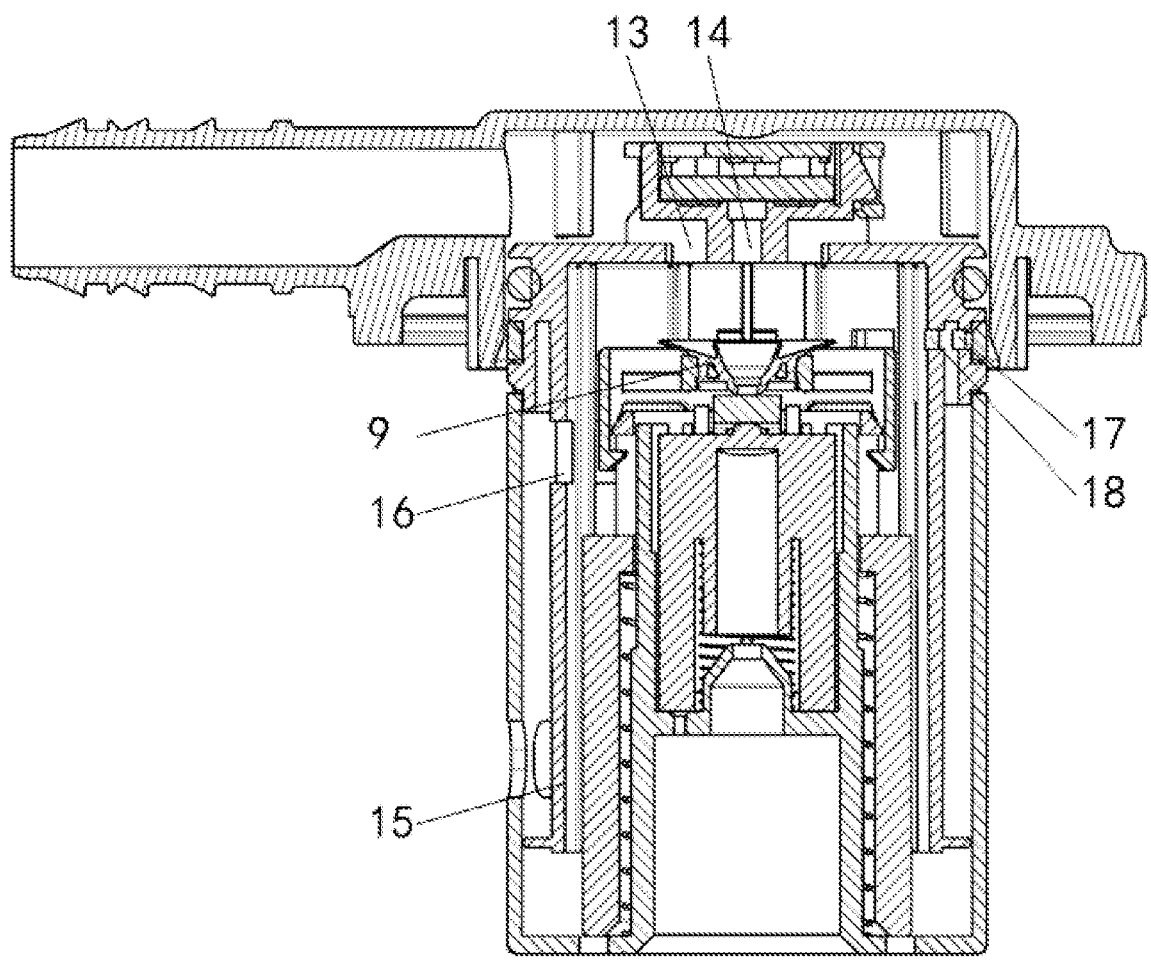
FIG. 11 is a schematic view of another operation mode of the valve of the invention.
Figure 12:
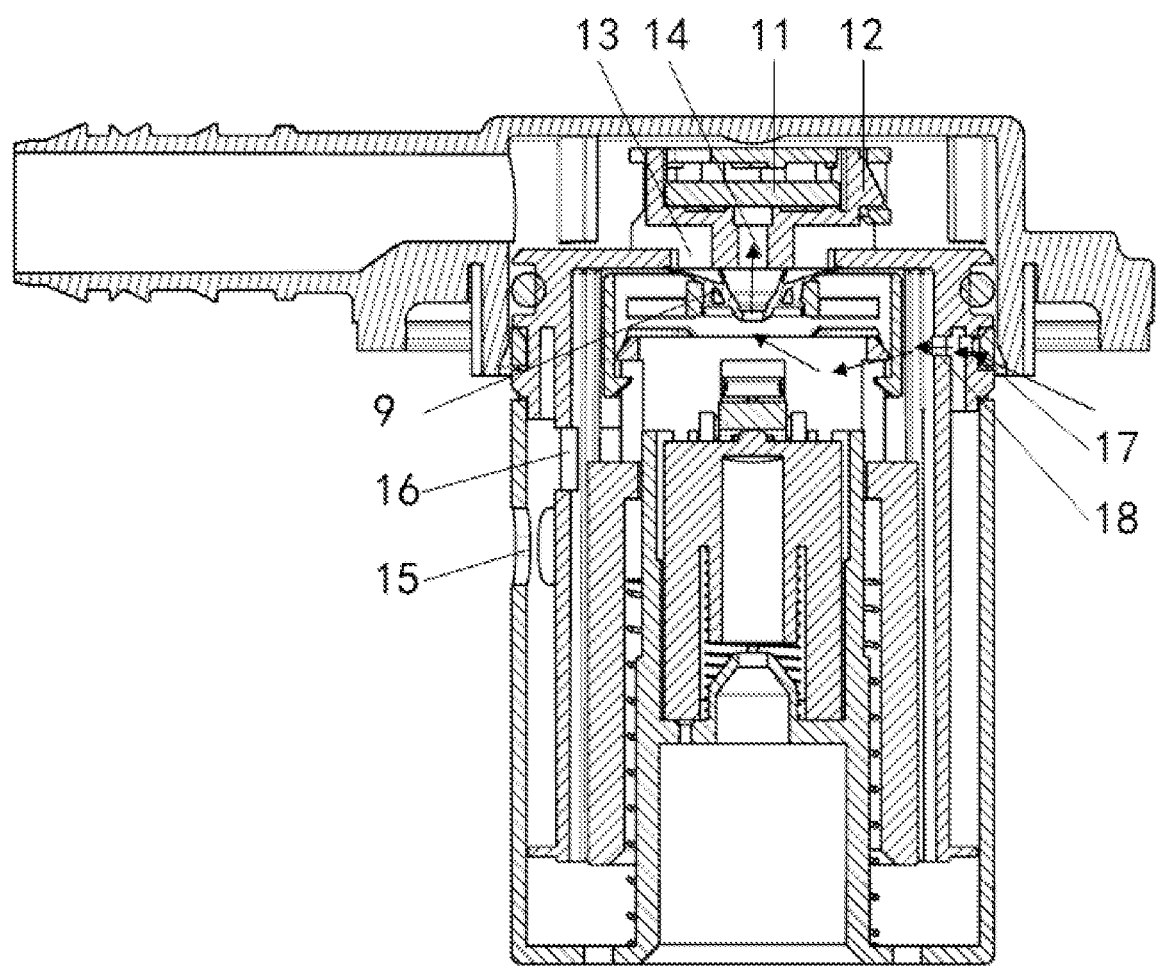
FIG. 12 is a schematic view of another operation mode of the valve of the invention.

2. Referring to FIGS. 10-12, the valve implements the fuel limit function of the refueling limit valve. The refueling limit function is a refueling gun jumping function. In general, the refueling gun jumping can be divided into two cases. However, in general, after the large flow passage in the refueling limit valve is closed or narrowed down, but also in the case of continuous refueling, the pressure in the fuel tank will rise sharply, and the liquid level on the side of the fuel filler pipe will also rise sharply, resulting in a fuel gun jump.

2.1 When the first connection port 15 opened on the side of the base is placed relatively upper, and the liquid level of the fuel rises to the position of the first connection port 15 during the refueling process, the fuel will momentarily enter the valve core accommodating cavity 19 through the third inflow passage 22. At this moment, the gravity of the whole composed of the first float 5 and the sealing assembly 9 slidably connected in the valve core accommodating cavity 19 may be less than the buoyancy of the fuel received and the elastic force of the first elastic member 6. Therefore, when the first float 5 will drive the sealing assembly 9 to move upwards until the sealing assembly 9 hits the top surface of the inner cavity of the adapter shell 2, the sealing assembly 9 closes off the first discharge opening 13, so that the large discharge passage in the valve is closed off, resulting in a sharp rise in the pressure in the fuel tank and thus a fuel gun jump.

2.2 Another case is that the valve has a refueling limit valve function. When the first connection port 15 opened on the base is relatively lower, after the liquid level is submerged to the lower edge of the first connection port 15 during the process of refueling, the ventilation window will become smaller and smaller as the liquid level of the fuel continues to rise in the process of refueling, so that the cross-sectional area of the ventilation passage will also become smaller and smaller. Thus, the pressure inside the fuel tank will continue to rise as the through-flow passage decreases, until the pressure inside the fuel tank rises to a certain degree, and then a fuel gun jump is produced.

Figure 13:
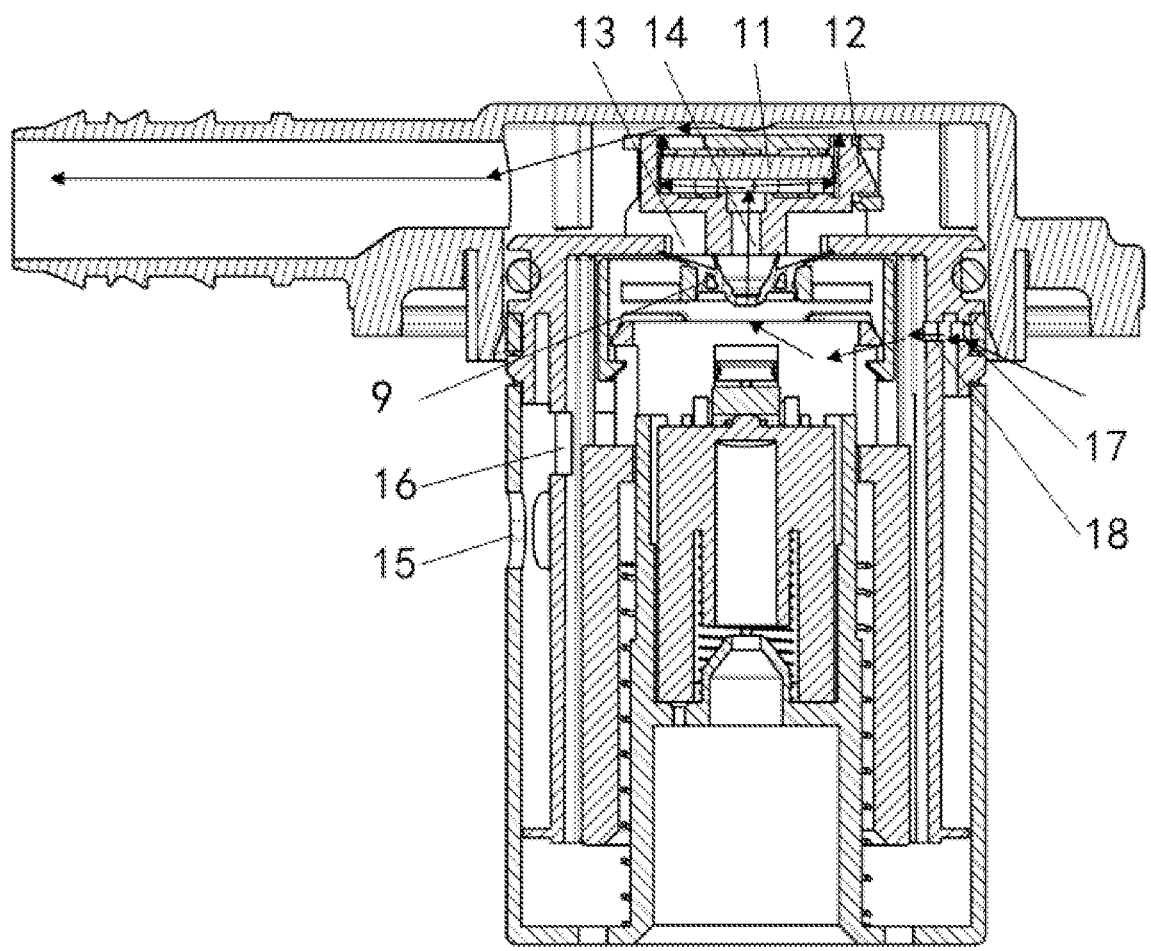
FIG. 13 is a schematic view of another operation mode of the valve of the invention.
Figure 14:
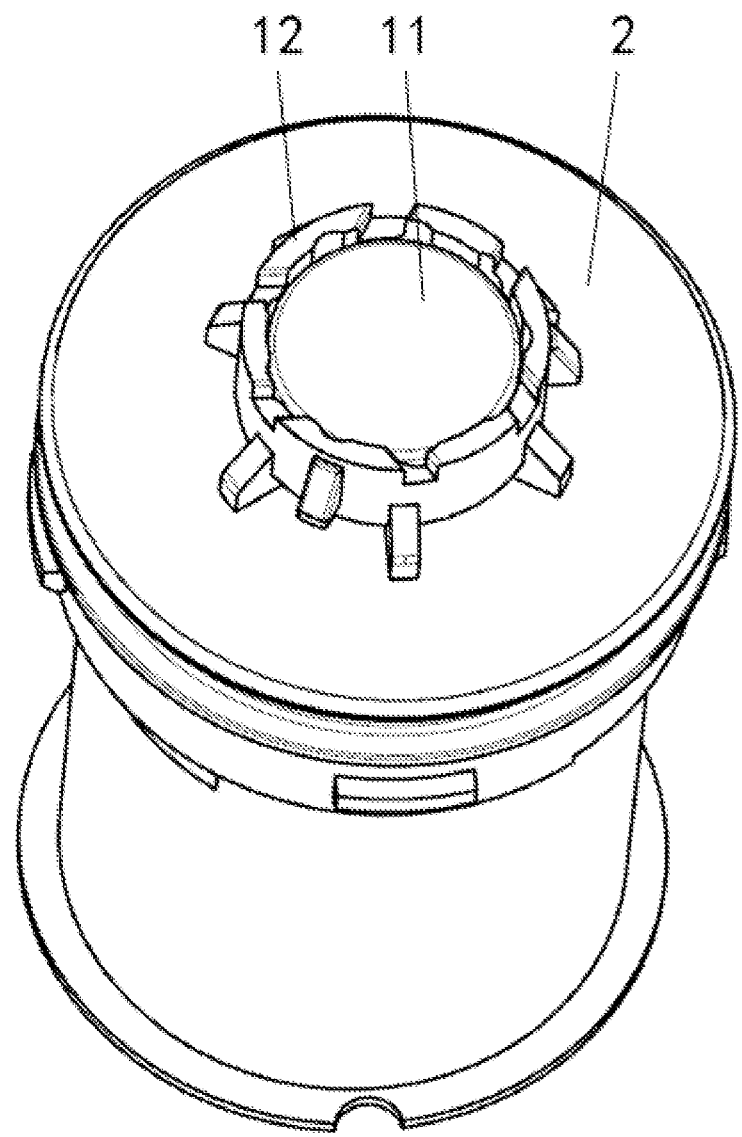
FIG. 14 is a schematic view of another operation mode of the valve of the invention.

3. Referring to FIGS. 13 and 14, the first discharge port 13 of the valve is closed and the pressure in the fuel tank is removed by the rolling-over valve function. In general, when the fuel tank is full or some vehicles are at a certain inclination angle, the first float 5 and the sealing assembly 9 inside the valve core are caused to be lifted, closing the first discharge port 13. However, since the overall difference is greater after the gravity of the second float 7 plus the movable member 10 minus the elastic force of the second elastic member 8, and there is also a greater downward gravity, the whole composed of the second float 7 and the movable member 10 does not rise. At this moment, the communication passage of the sealing assembly 9 for communicating with the second discharge port 14 is still open. However, since a pressure maintaining part is provided above the corresponding second discharge port 14 of the adapter shell 2, the valve as a whole is still in a relatively sealed state at this moment. Now, since the fuel inside the fuel tank continuously volatilizes or is affected by an increase in temperature, the pressure inside the fuel tank also continuously increases, which is necessary to exert the function of the rolling-over valve and timely discharge the increased pressure inside the fuel tank. When the pressure inside the fuel tank increases sufficiently to blow up the containment head 11, the pressure inside the fuel tank decreases. The gas flow enters the valve core accommodating cavity 19 through the second inflow passage on the side of the outer shell 4, passes through the communication passage on the sealing assembly 9 to the second discharge port 14 on the adapter shell 2, passes through the discharge passage designed in the pressure maintaining shell 12, and is discharged through the fluid discharge chamber.

4. Referring to FIG. 15, when there is a possibility that the vehicle may have a severe sloshing or a certain inclination angle during running, and the oil inside the fuel tank may also have a severe sloshing, it is necessary to timely seal the first discharge port 13 and the second discharge port 14 inside the valve so as to prevent the oil inside the fuel tank from leaking out through the discharge port inside the valve. The first float 5 and the sealing assembly 9 is lifted in time with shaking to close the first discharge port 13 on the adapter shell 2, and the second movable assembly is lifted in time to close the communication passage corresponding to the sealing assembly 9. In this way, the entire valve core forms a sealed state to prevent dynamic fuel leakage.

During the sloshing of the fuel tank, the valve core of the valve needs to be closed in time to prevent the dynamic fuel leakage, which requires that the valve core of the valve is relatively flexible, and can be closed in time during the sloshing. Thus, a valve is designed with two independent valve cores. The flexibility of the valve core is more easy to adjust, because for the two inner valve cores, one is on the outside and one is on the inside. The two valve cores are not directly related, so that the two valve cores can separately adjust the ratio of the float and the spring, and separately adjust the flexibility of each valve core, so as to achieve the purpose of preventing the fuel leakage.

Figure 16:
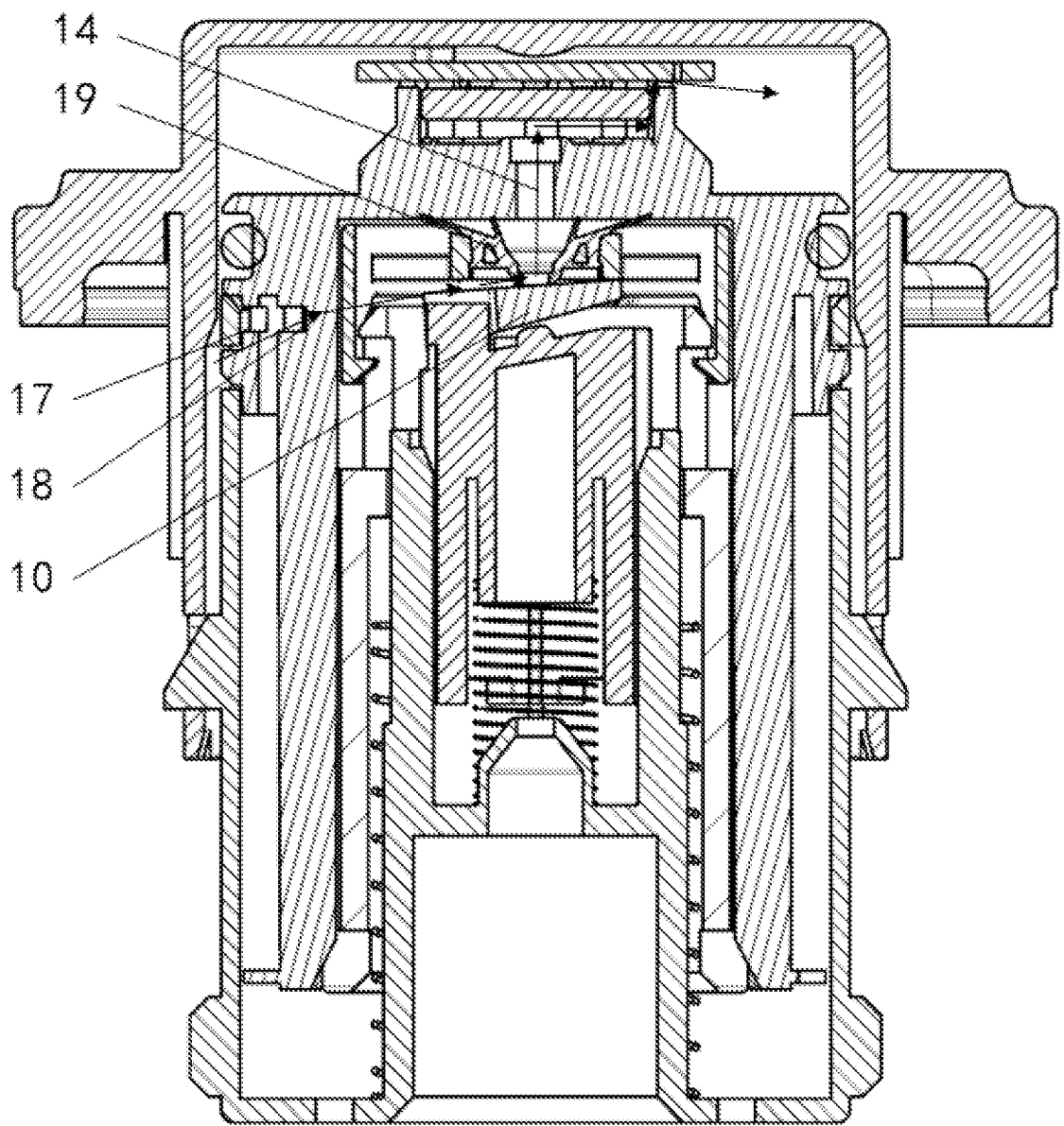
FIG. 16 is a schematic view of another operation mode of the valve of the invention.

5. Referring to FIG. 16, during fuel sloshing, the two valve cores can be closed in time to prevent the dynamic fuel leakage, as described in 4 above. At the same time, after the valve core is closed in time, the valve core needs not only a function of closing in time but also a function of opening in time during the process of fuel sloshing, because when the valve core is closed in time, the inside of the fuel tank will be in a completely closed state, so that the internal pressure will increase accordingly, and then the rolling-over valve function of the valve is required to open in time to discharge the pressure inside the fuel tank.

As can be seen from P=F/S, when F is constant, the larger the contact area S is, the smaller P is. Since the area of the first float 5 inside the valve core and the first discharge port 13 corresponding to the sealing assembly 9 is relatively large, it is difficult for the first valve core assembly to open in time for pressure relief when there is a certain pressure inside the fuel tank, so that it is required that the internal second float 7 and the small hole corresponding to the movable assembly can be opened in time for pressure relief.

The embodiments of the invention have been described in detail with reference to the accompanying drawings, but the invention is not limited to the above embodiments. Even if various changes are made to the invention, provided that these changes fall within the scope of the claims of the invention and equivalent technologies, they still fall within the scope of protection of the invention.

The invention claimed is:

1. A valve, comprising a valve body, a valve core part and a pressure maintaining part;
    wherein a valve core accommodating cavity is provided in the valve body; the valve body is provided with a first inflow passage and a second inflow passage which communicate the valve core accommodating cavity with a space outside the valve body, and an inlet of the second inflow passage is higher than an inlet of the first inflow passage; an upper end of the valve body is provided with a first discharge port and a second discharge port in communication with the valve core accommodating cavity;
    the valve core comprises a first valve core assembly, and a second valve core assembly;
    wherein the first valve core assembly and the second valve core assembly are respectively vertically slidably connected to the valve core accommodating cavity, with movement tracks thereof not interfering with each other, and are respectively used for opening or closing the first discharge port and the second discharge port;
    the pressure maintaining part is provided on a top surface of the valve body, and an input end communicates with the second discharge port for defining a pressure required to discharge the fluid from the second discharge port;
    after the first discharge port is closed in cooperation with the first valve core assembly, and after the fluid in the valve core accommodating cavity has to reach a certain pressure value, the pressure maintaining part will open the second discharge port, and the fluid will be discharged from the second discharge port, so as to achieve the function of a rolling-over valve; the two valve core assemblies achieve different functions without affecting each other; and at the same time, a combination valve with different technical requirements can be obtained by respectively adjusting the two valve core assemblies.

2. The valve according to claim 1, wherein the valve body comprises an upwardly opened outer shell and a downwardly opened adapter shell; the outer shell is sleeved on a lower end of the adapter shell and is fixedly connected to the adapter shell;
    an inner wall surface of the adapter shell cooperates with a bottom surface of the outer shell to form the valve core accommodating cavity; at least one first connection port is opened on the shell body of the outer shell; the first connection port, an outer wall surface of the adapter shell, and an inner wall surface of the outer shell cooperate to form a third inflow passage communicating with the valve core accommodating cavity;
    at least one second connection port communicating with the valve core accommodating cavity is provided on the shell body of the adapter shell, and the first connection port and the second connection port cooperate to form the first inflow passage;
    at least one third connection port is opened on the outer shell; at least one fourth connection port communicating with the valve core accommodating cavity is provided on the shell body of the adapter shell; and the third connection port, the fourth connection port, and the communication passage of the sealing assembly cooperate to form the second inflow passage.

3. The valve according to claim 2, wherein the inner wall surface of the adapter shell is provided with a plurality of vertically arranged first guide sliding rails, and the first valve core assembly is slidably connected to the first guide sliding rails;
    a hollow member is provided on the bottom surface of the inner cavity of the shell; the hollow member cooperates with the bottom surface of the inner cavity to form a vertical guide groove; a plurality of vertically arranged second guide sliding rails are provided on the inner wall surface of the hollow member; and the second valve core assembly is slidably connected to the second guide sliding rail.

4. The valve according to claim 3, wherein the first valve core assembly is sleeved within the hollow member and the second valve core assembly.

5. The valve according to claim 2, wherein the third inflow passage is provided with a stopper for limiting a flow area of the third inflow passage.

6. The valve according to claim 5, wherein the stopper is an annular stopper provided on an outer wall surface of the adapter shell for limiting the flow area of the third inflow passage.

7. The valve according to claim 1, wherein the valve core further comprises a sealing assembly provided at a top end of the valve core accommodating cavity or vertically slid in the valve core accommodating cavity for engaging the first valve core assembly to open or close the first discharge port; the sealing assembly is further provided with a communication passage for communicating the second discharge port and the second inflow passage, for cooperating with the second valve core assembly to switch the second discharge port.

8. The valve according to claim 7, wherein the sealing assembly is provided on a top surface of the valve core accommodating cavity, the sealing assembly being a seal; the seal is provided at the first discharge port and the second discharge port;
    the seal forms a communication passage through which the first discharge port communicates with the valve core accommodating cavity for cooperating the first valve core assembly to open or close the first discharge port; the seal forms a communication passage through which the second discharge port communicates with the valve core accommodating cavity for engaging the second valve core assembly to open or close the second discharge port.

9. The valve according to claim 7, wherein the sealing assembly is slidably connected to the valve core accommodating cavity, the sealing assembly comprising a slide and a seal;

the slider is slidably connected to the valve core accommodating cavity, and the seal is mounted on the slider; the seal is provided with a sealing block for sealing the first discharge port, and is further provided with a communication passage for communicating with the second discharge port;

the slider is driven to slide up and down by the first valve core assembly, and cooperates with the sealing block to open or close the first discharge port; and the communication passage communicating with the second discharge port is adapted to cooperate with the second valve core assembly to open or close the second discharge port.

10. The valve according to claim 1, wherein the pressure maintaining part comprises a pressure maintaining shell and a pressure maintaining cap; an accommodating space is provided in the pressure maintaining shell, and an inflow hole and a discharge hole in communication with the accommodating space are further provided on the pressure maintaining shell; the pressure maintaining shell is provided on a top surface of the valve body, and the inflow hole communicates with the second discharge port; and the pressure maintaining cap is slidably connected to the accommodating space for opening or closing the inflow hole.

11. The valve according to claim 10, further comprising an elevation tube having one end mounted to the valve body and communicating with the second discharge port; the other end of the elevation tube is connected to the pressure maintaining shell and communicates with the inflow hole; the pressure maintaining shell cooperates with the valve body through the elevation tube to form a large exhaust passage that communicates with the first discharge port.

12. The valve according to claim 10, wherein the pressure maintaining part further comprises an elastic member provided in the accommodating cavity, and both ends of the elastic member are respectively connected to an inner wall surface of the accommodating cavity and the pressure maintaining cap for providing a pressing force for the pressure maintaining cap to close the inflow hole.

13. The valve according to claim 1, further comprising an elevation part provided on a bottom surface of the valve core accommodating cavity and corresponding to any one of the valve core assemblies in the valve core accommodating cavity for raising a lowest height of the corresponding valve core assembly.

14. The valve according to claim 13, wherein the elevation part is a recessed groove provided on an outer bottom surface of the valve body, and a recess direction of the recessed groove faces towards the valve core accommodating cavity to form a protrusion in the valve core accommodating cavity; and a corresponding valve core assembly is mounted on the top surface of the protrusion.

15. The valve according to claim 1, further comprising a connecting flange, wherein the connecting flange is connected to the valve body and cooperates with a top surface of the valve body to form a fluid discharge chamber for directing the fluid discharged from the first discharge port and the pressure maintaining part.

16. The valve according to claim 1, wherein the first valve core assembly comprises a first float and a first elastic member; the first float is slidably connected to the valve core accommodating cavity; and both ends of the first elastic member are respectively connected to the first float and the bottom surface of the valve core accommodating cavity.

17. The valve according to claim 1, wherein the second valve core assembly comprises a second float, a second elastic member, and a movable member; the second float is slidably connected to the valve core accommodating cavity, and both ends of the second elastic member are respectively connected to the second float and the bottom surface of the valve core accommodating cavity; and the movable member is movably connected to a top surface of the second float for cooperating the sealing assembly to open or close the second discharge port.

18. A multi-functional combination valve, comprising the valve according to claim 1.

19. A CFLVV valve, comprising the valve according to claim 1.

* * * * *